(12) United States Patent
Xu et al.

(10) Patent No.: US 12,407,826 B2
(45) Date of Patent: Sep. 2, 2025

(54) TIME-DOMAIN FILTERING METHOD AND APPARATUS, ELECTRONIC DEVICE, AND COMPUTER-READABLE STORAGE MEDIUM

(71) Applicant: Alibaba Innovation Private Limited, Singapore (SG)

(72) Inventors: Shengyang Xu, Zhejiang (CN); Jianhua Chen, Zhejiang (CN); Yan Ye, San Diego, CA (US)

(73) Assignee: Alibaba Innovation Private Limited, Singapore (SG)

( * ) Notice: Subject to any disclaimer, the term of this patent is extended or adjusted under 35 U.S.C. 154(b) by 0 days.

(21) Appl. No.: 18/625,679

(22) Filed: Apr. 3, 2024

(65) Prior Publication Data
US 2024/0340415 A1    Oct. 10, 2024

(30) Foreign Application Priority Data

Apr. 7, 2023 (CN) .......................... 202310408690.3

(51) Int. Cl.
| | |
|---|---|
| *H04N 19/00* | (2014.01) |
| *H04N 19/117* | (2014.01) |
| *H04N 19/137* | (2014.01) |
| *H04N 19/156* | (2014.01) |
| *H04N 19/172* | (2014.01) |
| *H04N 19/176* | (2014.01) |
| *H04N 19/177* | (2014.01) |
| *H04N 19/80* | (2014.01) |

(52) U.S. Cl.
CPC ......... *H04N 19/117* (2014.11); *H04N 19/137* (2014.11); *H04N 19/156* (2014.11); *H04N 19/172* (2014.11); *H04N 19/176* (2014.11); *H04N 19/177* (2014.11); *H04N 19/80* (2014.11)

(58) Field of Classification Search
CPC ...................................................... H04N 19/00
See application file for complete search history.

(56) References Cited

U.S. PATENT DOCUMENTS

| | | | | |
|---|---|---|---|---|
| 2006/0045181 | A1* | 3/2006 | Chen .................... | H04N 19/117 375/240.12 |
| 2013/0076921 | A1* | 3/2013 | Owen .................. | H04N 23/683 348/208.4 |

* cited by examiner

*Primary Examiner* — Maryam A Nasri
(74) *Attorney, Agent, or Firm* — Finnegan, Henderson, Farabow, Garrett & Dunner, LLP

(57) ABSTRACT

A time-domain filtering method is provided, including: determining a to-be-filtered image frame in a group of pictures; extracting a relative motion feature of the to-be-filtered image frame, where the relative motion feature represents relative motion complexity between image contents of the to-be-filtered image frame and image contents of the remaining image frames in the group of pictures; and determining a target filtering magnitude corresponding to the relative motion feature, and performing time-domain filtering on the to-be-filtered image frame by using the target filtering magnitude.

20 Claims, 9 Drawing Sheets

TIME-DOMAIN FILTERING METHOD AND APPARATUS, ELECTRONIC DEVICE, AND COMPUTER-READABLE STORAGE MEDIUM

CROSS-REFERENCE TO RELATED APPLICATIONS

The present application claims priority to and the benefits of Chinese Patent Application No. 202310408690.3, filed on Apr. 7, 2023, which is incorporated herein by reference in its entirety.

TECHNICAL FIELD

The present disclosure relates to the field of computer technologies, specifically to a time-domain filtering method, an apparatus, an electronic device, and a computer-readable storage medium.

BACKGROUND

Before encoding an image frame, time-domain filtering is usually performed on an original image frame by using a bilateral filter. In this way, video noise reduction can be effectively performed to improve subsequent encoding efficiency.

In a related time-domain filtering scheme, to facilitate operations, a same preset filtering magnitude is usually applied to perform time-domain filtering on each image frame in a video stream. A result of subsequent encoding indicates worse rate-distortion performance when performing video encoding on a filtered image frame obtained by using the related time-domain filtering scheme.

SUMMARY

In consideration of the above situation, embodiments of the present disclosure provide a time-domain filtering scheme, to at least partially resolve the foregoing problem.

According to some embodiments of the present disclosure, an electronic device is provided, including: one or more processors, a memory, a communication interface, and a communication bus. The one or more processors, the memory, and the communication interface communicate with each other through the communication bus. The memory is configured to store at least one executable instruction, and the executable instruction enables the one or more processors to cause the electronic device to perform operations that include: determining a to-be-filtered image frame in a group of pictures; extracting a relative motion feature of the to-be-filtered image frame, where the relative motion feature represents relative motion complexity between image contents of the to-be-filtered image frame and image contents of the remaining image frames in the group of pictures; and determining a target filtering magnitude corresponding to the relative motion feature, and performing time-domain filtering on the to-be-filtered image frame by using the target filtering magnitude.

According to some embodiments of the present disclosure, a time-domain filtering method is provided, including: determining a to-be-filtered image frame in a group of pictures; extracting a relative motion feature of the to-be-filtered image frame, where the relative motion feature represents relative motion complexity between image contents of the to-be-filtered image frame and image contents of the remaining image frames in the group of pictures; and determining a target filtering magnitude corresponding to the relative motion feature, and performing time-domain filtering on the to-be-filtered image frame by using the target filtering magnitude.

According to some embodiments of the present disclosure, an electronic device is provided, including: one or more processors, a memory, a communication interface, and a communication bus. The one or more processors, the memory, and the communication interface communicate with each other through the communication bus. The memory is configured to store at least one executable instruction, and the executable instruction enables the one or more processors to cause the electronic device to perform operations that include: obtaining a group of to-be-encoded pictures; determining a to-be-filtered image frame in the group of to-be-encoded pictures; extracting a relative motion feature of the to-be-filtered image frame, where the relative motion feature represents relative motion complexity between image contents of the to-be-filtered image frame and image contents of the remaining image frames in the group of pictures; determining a target filtering magnitude corresponding to the relative motion feature, and performing time-domain filtering on the to-be-filtered image frame by using the target filtering magnitude; and encoding a group of pictures obtained by performing the time-domain filtering, to obtain a video bitstream.

BRIEF DESCRIPTION OF THE DRAWINGS

To describe the technical solutions in embodiments of the present disclosure or in conventional technologies more clearly, the following briefly introduces the accompanying drawings required for describing the embodiments or the conventional technologies. Apparently, the accompanying drawings in the following descriptions merely show some embodiments described in embodiments of the present disclosure, and a person of ordinary skill in the art can still derive other drawings from these accompanying drawings.

DETAILED DESCRIPTION

To make a person skilled in the art better understand the technical solutions in embodiments of the present disclosure, the following clearly and completely describes the technical solutions in embodiments of the present disclosure with reference to the accompanying drawings in embodiments of the present disclosure. Apparently, the described embodiments are merely a part rather than all of the embodiments of the present disclosure. All other embodiments obtained by a person of ordinary skill in the art based on embodiments of the present disclosure shall fall within the protection scope of embodiments of the present disclosure.

Before encoding an image frame, time-domain filtering processing is usually performed on an original image frame by using a bilateral filter. In this way, video noise reduction is effectively performed, and efficiency of subsequent encoding is improved.

Figure 1:
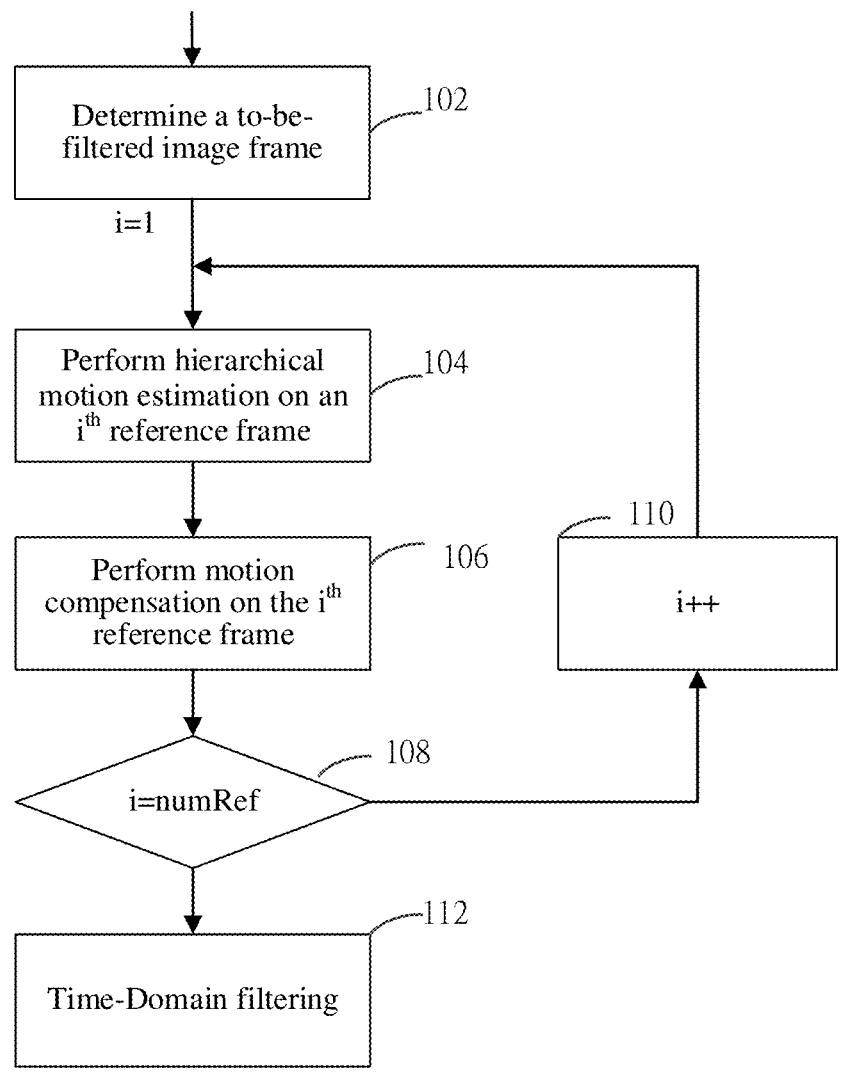
FIG. 1 is a flowchart of an example method for motion compensation time-domain filtering, according to some embodiments of the present disclosure.

FIG. 1 is a flowchart of an example method for motion compensation time-domain filtering, according to some embodiments of the present closure. The following describes a process of motion compensation time-domain filtering with reference to FIG. 1.

Figure 2:
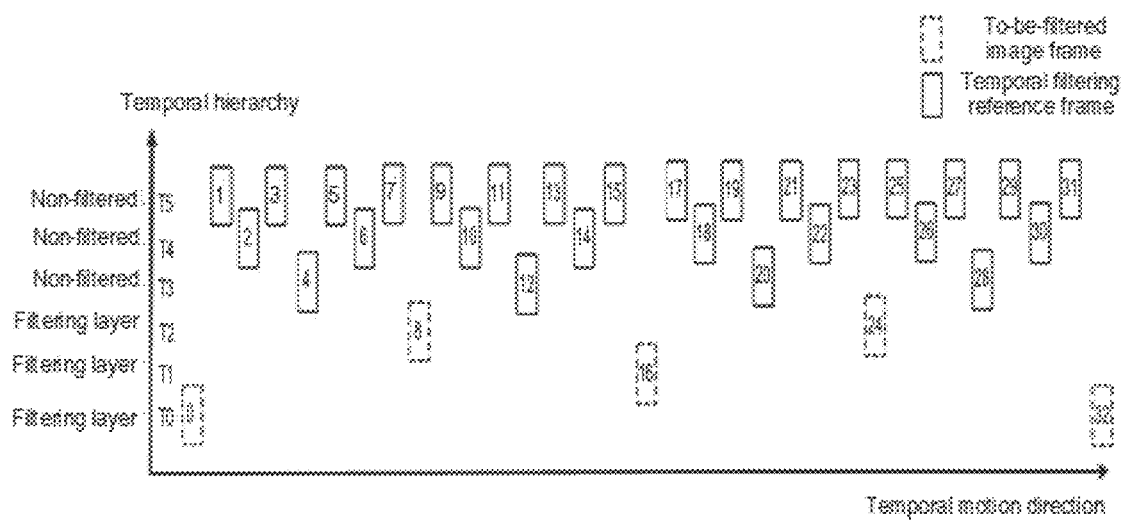
FIG. 2 is a distribution diagram of an example time-domain layer of each image frame in a group of pictures (GOP), according to some embodiments of the present disclosure.

Step 102: Determine a to-be-filtered image frame to be performed with the time-domain filtering in a group of pictures. In Step 102, the to-be-filtered image frame can be selected from the group of pictures based on an actual situation and a time-domain layer at which each image frame is located. Specifically, for example, in the group of pictures, a serial number of the time-domain layer at which each image frame is located can be obtained based on a type of the group of pictures; one or several serial numbers of time-domain layers can be selected as a filtering layer; and an image frame located at the filtering layer is determined as the to-be-filtered image frame. A hierarchization of the time-domain layers and an introduction of the serial numbers of the time-domain layers are mainly purposed to facilitate description of a reference relationship rule between image frames in each the group of pictures. Specifically, for a specific type of group of pictures, the time-domain layer (and its serial number) at which each image frame is located in the group of pictures is predetermined based on an encoding order and a reference relationship in an encoding process. In addition, a larger serial number indicates a higher time-domain layer, whereas a smaller serial number indicates a lower time-domain layer. In the encoding process, the image frame at a high time-domain layer is encoded with reference to the image frame at a same time-domain layer or at a low time-domain layer. FIG. 2 is an example time-domain layer distribution diagram for each image frame in a group of pictures (GOP) 32, according to some embodiments of the present disclosure. Time-domain layers T0, T1, and T2 can be selected as the filtering layer. Such that all of the image frames (a $0^{th}$ frame, an $8^{th}$ frame, a $16^{th}$ frame, a $24^{th}$ frame, and a $32^{nd}$ frame) in the filtering layer are the to-be-filtered image frames. And the remaining image frames are reference frames for the time-domain filtering. The GOP 32 represents that a size of the group of pictures is 32, that is, there are 32 consecutive image frames in one group of pictures.

Step 104: For a single to-be-filtered image frame, perform hierarchical motion estimation on an $i^{th}$ reference frame respectively, to obtain a motion vector corresponding to the $i^{th}$ reference frame, where an initial value of i is 1. Specifically, the to-be-filtered image frame can be divided into blocks, to obtain a plurality of image blocks with a same size, and then the hierarchical motion estimation is respectively performed on the $i^{th}$ reference frame for each the image block, to obtain the motion vector of each the image block.

Step 106: For the single to-be-filtered image frame, perform motion compensation on the $i^{th}$ reference frame based on the motion vector obtained in Step 104, to obtain a motion compensation frame corresponding to the $i^{th}$ reference frame.

Step 108: Repeat Step 104 and Step 106, until the motion estimation and the motion compensation are completed on the reference frames of each the to-be-filtered frame. Specifically, for the single to-be-filtered image frame, after Step 106, determine whether i is equal to a total quantity of reference frames numRef corresponding to the to-be-filtered image frame. If so, after Step 108 is completed, perform Step 110. Otherwise, go to Step 110.

Step 110: Plus the value of i by one and return to Step 104.

Step 112: Perform time-domain filtering. Specifically, based on Formula 1, perform weighted average pixel by pixel on the to-be-filtered image frame and the motion compensation frame obtained from each the reference frame. A weighted coefficient w(j) of each the motion compensation frame in Formula 1 is calculated according to Formula 2, and a coefficient bw in Formula 2 is a filtering magnitude:

$$newVal(i) = \frac{orgVal(i) + \sum_{j}^{numRef} w(j) refVal(j)}{1 + \sum_{j}^{numRef} w(j)} \quad \text{Formula 1}$$

$$w(j) = bw * s_{cur} * s_{ref} * e^{\frac{-\Delta I(i)^2}{2\sigma(QP)^2}}, \quad \text{Formula 2}$$

where newVal(i) is a pixel value of an $i^{th}$ pixel in a filtered image frame; orgVal(i) is a pixel value of the $i^{th}$ pixel in the to-be-filtered image frame; numRef is the total quantity of reference frames of the to-be-filtered image frame; w(j) is the weighted coefficient of the motion compensation frame corresponding to a $j^{th}$ reference frame; $s_{cur}$ is a fixed parameter related to the time-domain layer at which the to-be-filtered image frame is located; $s_{ref}$ is a fixed parameter related to a distance between the reference frames and the total quantity of reference frames; σ(QP) represents a parameter related to a Quant Parameter QP (one of quantization parameters)'s value; and ΔI(i) represents a parameter related to a pixel difference value of a pixel reference frame of the to-be-filtered image frame.

For a conventional time-domain filtering method, in Step 110, the filtering magnitude bw is generally set to be a constant. In other words, for any to-be-filtered image frame, a same filtering magnitude is used to perform the time-domain filtering. A result of subsequent encoding indicates a poor rate-distortion performance while performing video encoding on a filtered image frame obtained by applying the above filtering scheme.

However, in embodiments of the present disclosure, after determining the to-be-filtered image frame in the group of pictures, the to-be-filtered image frame's relative motion feature that represents relative motion complexity between image contents of the to-be-filtered image frame and image contents of the remaining image frames is extracted. Also, based on the relative motion feature, a target filtering magnitude matching the above-mentioned relative motion complexity is adaptively determined and used to perform the time-domain filtering. In addition, when adaptively determining the filtering magnitude, the target filtering magnitude is set to be larger in response to lower relative motion complexity. In this way, for an image frame with more complex relative motion, the filtering magnitude is appropriately reduced during filtering, thereby retaining more valid information to improve the rate-distortion performance of the subsequent encoding. For an image frame with simpler relative motion, the filtering magnitude is appropriately enhanced during filtering, thereby eliminating more redundant information to improve the rate-distortion performance of the subsequent encoding.

The following further describes specific implementations of embodiments of the present disclosure with reference to the accompanying drawings of embodiments of the present disclosure.

Figure 3:
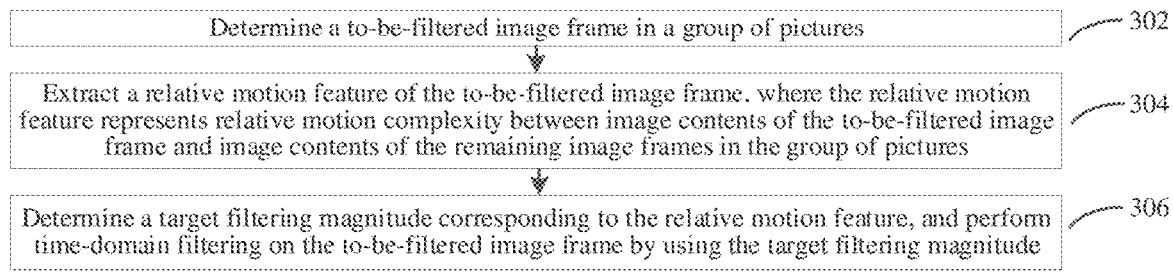
FIG. 3 is a flowchart of an example time-domain filtering method according to some embodiments of the present disclosure.

FIG. 3 is a flowchart of an example method of determining a size of a group of pictures according to some embodiments of the present disclosure. Specifically, the method of determining the size of the group of pictures provided in some embodiments of the present disclosure includes the following steps.

Step 302: Determine a to-be-filtered image frame in the group of pictures.

Step 304: Extract a relative motion feature of the to-be-filtered image frame, where the relative motion feature represents relative motion complexity between image contents of the to-be-filtered image frame and image contents of the remaining image frames in the group of pictures.

Specifically, the specific representations of the relative motion feature are not limited and can be set independently based on an actual situation in embodiments of the present disclosure. For example, the relative motion feature of the to-be-filtered image frame can be represented based on an interframe encoding cost between the to-be-filtered image frame and the remaining image frames in the group of pictures. A larger interframe encoding cost indicates higher relative motion complexity. The relative motion feature of the to-be-filtered image frame can alternatively be represented based on a degree of pixel value difference (such as a variance) between the image of the to-be-filtered image frame and the image of the remaining image frames in the group of pictures. Also, a larger degree of pixel value difference indicates more complex relative motion. The relative motion feature of the to-be-filtered image frame can alternatively be represented based on a quantity of static blocks between the image of the to-be-filtered image frame and the image of the remaining image frames in the group of pictures. A smaller quantity of static blocks indicates more complex relative motion, and so on.

Step 306: Determine a target filtering magnitude corresponding to the relative motion feature, and perform time-domain filtering on the to-be-filtered image frame by using the target filtering magnitude.

Further, the target filtering magnitude can be determined based on the following rule: a smaller relative motion complexity indicates a larger target filtering magnitude. In this way, for an image frame with a more complex relative motion, filtering magnitude is appropriately reduced during filtering, thereby retaining more valid information to improve rate-distortion performance of subsequent encoding. For an image frame with a simpler relative motion, filtering magnitude is appropriately enhanced during filtering, thereby eliminating more redundant information to improve the rate-distortion performance of the subsequent encoding.

The specific approach of determining the target filtering magnitude corresponding to the relative motion feature is not limited and can be set independently based on an actual situation in embodiments of the present disclosure.

Specifically, for example, a previous correspondence between the relative motion feature and the filtering magnitude can be preset. When the relative motion feature is extracted through Step 304, the target filtering magnitude corresponding to the relative motion feature can be determined based on the above-mentioned correspondence. For another example, a filtering enhancement coefficient and a standard filtering magnitude can be introduced, and a correspondence between the filtering enhancement coefficient and the relative motion feature is determined, where the standard filtering magnitude is a preset constant. When the relative motion feature is extracted through Step 304, the filtering enhancement coefficient corresponding to the relative motion feature can be determined based on the above-mentioned correspondence, and then the target filtering magnitude can be obtained based on the filtering enhancement coefficient and the standard filtering magnitude. For example, a product of the filtering enhancement coefficient and the standard filtering magnitude can be determined as the target filtering magnitude.

Optionally, for example, for the scheme in which the relative motion feature of the to-be-filtered image frame is represented based on the quantity of static blocks between the image of the to-be-filtered image frame and the image of the remaining image frames in the group of pictures, Step 304 can include: calculating a total quantity of static blocks included in the to-be-filtered image frame as the relative motion feature of the to-be-filtered image frame, where a static block is an encoding unit whose relative motion complexity is less than a preset threshold.

Further, the foregoing static block can be the static block transmitted between the to-be-filtered image frame and a non-filtered image frame that has a direct reference relationship with the to-be-filtered image frame, or can include accumulative static blocks transmitted from each non-filtered image frame which is under a same reference relationship propagation path with the to-be-filtered image frame. In other words, the static block can be the static block transmitted from a previous time-domain layer of the to-be-filtered image frame, or can be the static block obtained by accumulating the static blocks sequentially transmitted layer by layer from a highest time-domain layer.

Accordingly, the step 306 can include: determining the filtering enhancement coefficient based on the total quantity of static blocks; and determining the product of the filtering enhancement coefficient and the standard filtering magnitude as the target filtering magnitude, where a larger total quantity of static blocks indicates a larger filtering enhancement coefficient.

Figure 4:
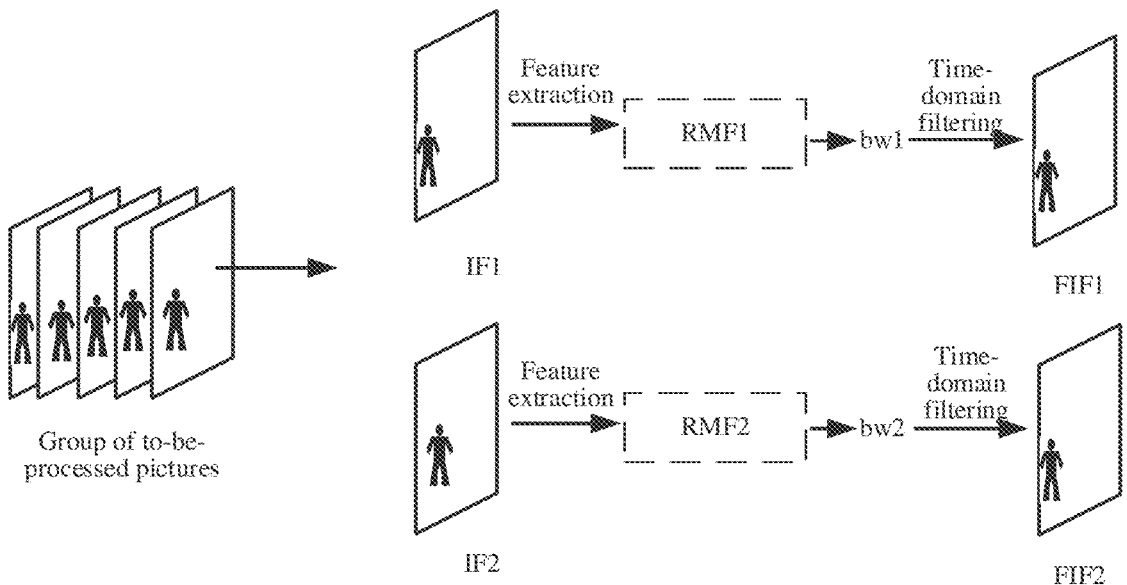
FIG. 4 is a schematic diagram of an example scenario of FIG. 3, according to some embodiments of the present disclosure.

FIG. 4 is a schematic diagram of an example scenario of FIG. 3, according to some embodiments of the present disclosure. The following describes, with reference to the schematic diagram shown in FIG. 4, some embodiments of the present disclosure by using a specific scenario as an example.

A group of to-be-processed pictures is obtained, and the to-be-filtered image frame is determined as a first image frame IF1 and a second image frame IF2 from the group of pictures. Feature extraction is performed on the first image frame IF1 to obtain a first relative motion feature RMF1. And feature extraction is performed on the second image frame IF2 to obtain a second relative motion feature RMF2. A first target filtering magnitude bw1 corresponding to the first relative motion feature RMF1 and a second target filtering magnitude bw2 corresponding to the second relative motion feature RMF2 are determined. The time-domain filtering is performed on the first image frame IF1 by using the first target filtering magnitude bw1 to obtain a first filtered image frame FIF1. And the time-domain filtering is performed on the second image frame IF2 by using the second target filtering magnitude bw2 to obtain a second filtered image frame FIF2. Thus, the time-domain filtering operation on the group of to-be-processed pictures is completed.

According to the time-domain filtering scheme provided in this embodiment of the present disclosure, after the to-be-filtered image frame in the group of pictures is determined, the to-be-filtered image frame's relative motion feature that represents the relative motion complexity between the image contents of the to-be-filtered image frame and the image contents of the remaining image frames is extracted. Then, based on the relative motion feature, the target filtering magnitude that matches the relative motion complexity is adaptively determined. And the target filtering magnitude is used to perform the time-domain filtering. In addition, when adaptively determining the filtering magnitude, in response to a smaller relative motion complexity, the target filtering magnitude is set to be larger. In this way, for an image frame with a more complex relative motion, the filtering magnitude is appropriately reduced during the filtering, thereby more valid information is retained to improve the rate-distortion performance of the subsequent encoding. For an image frame with a simpler relative motion, the filtering magnitude is appropriately enhanced during the filtering, thereby eliminating more redundant information is eliminated to improve the rate-distortion performance of the subsequent encoding. Therefore, in embodiments of the present disclosure, the target filtering magnitude that matches the relative motion complexity of the image frame can be adaptively determined and used to perform the time-domain filtering. Such that when a filtered image frame is encoded, the corresponding rate-distortion performance is improved.

The time-domain filtering method provided in embodiment 1 of the present disclosure can be performed by a video encoding terminal (for example, an encoder) before encoding a video stream, be applied to perform the time-domain filtering on the to-be-filtered image frame in the group of pictures, and then be applied perform a subsequent encoding operation on the filtered image frame. The foregoing video encoding terminal can be a client or a server. The method provided in embodiments of the present disclosure can be applied to various scenarios, for example, a video-on-demand scenario, and a corresponding video encoding terminal is the (cloud) server. Specifically, a (cloud) server device can perform the time-domain filtering on a to-be-filtered image frame in a group of pictures (including video image frames of a film and television work such as a movie or TV series) by using the time-domain filtering method provided in embodiments of the present disclosure. And then the (cloud) server device can perform the subsequent encoding operation on filtered video data, to obtain a video bitstream. The video bitstream is then sent to a client device to be decoded in the client device, to obtain and play corresponding video media data. In another example, a scenario of storage and streaming transmission for a conventional video game can be applied. Specifically, the time-domain filtering is performed on a to-be-filtered image frame in a group of pictures by using the time-domain filtering method provided in embodiments of the present disclosure, and then the subsequent encoding operation is performed on a filtered video game to obtain a corresponding video code stream, to enable the video game to be stored and transmitted in a video stream service or other similar applications. In still another example, a low-latency scenario such as a video conference or a live video. Specifically, video data of the conference can be collected by a video collection device, and then the time-domain filtering is performed on the video data by using the time-domain filtering method provided in embodiments of the present disclosure. The subsequent encoding operation is performed on filtered video data to obtain a corresponding video code stream, and the video code stream is sent to a conference terminal and decoded by the conference terminal to obtain and display a corresponding conference video picture. For another example, a virtual reality scenario can be applied. The time-domain filtering is performed on video data by using the time-domain filtering method provided in embodiments of the present disclosure, and then the subsequent encoding operation is performed on filtered video data to obtain a corresponding video code stream. The video code stream is sent to a virtual reality related device (such as Virtual Reality (VR) virtual glasses), and the video code stream is decoded by the VR device to obtain a corresponding video picture, to implement a corresponding VR function (e.g., display) based on the video picture, and so on.

Figure 5:
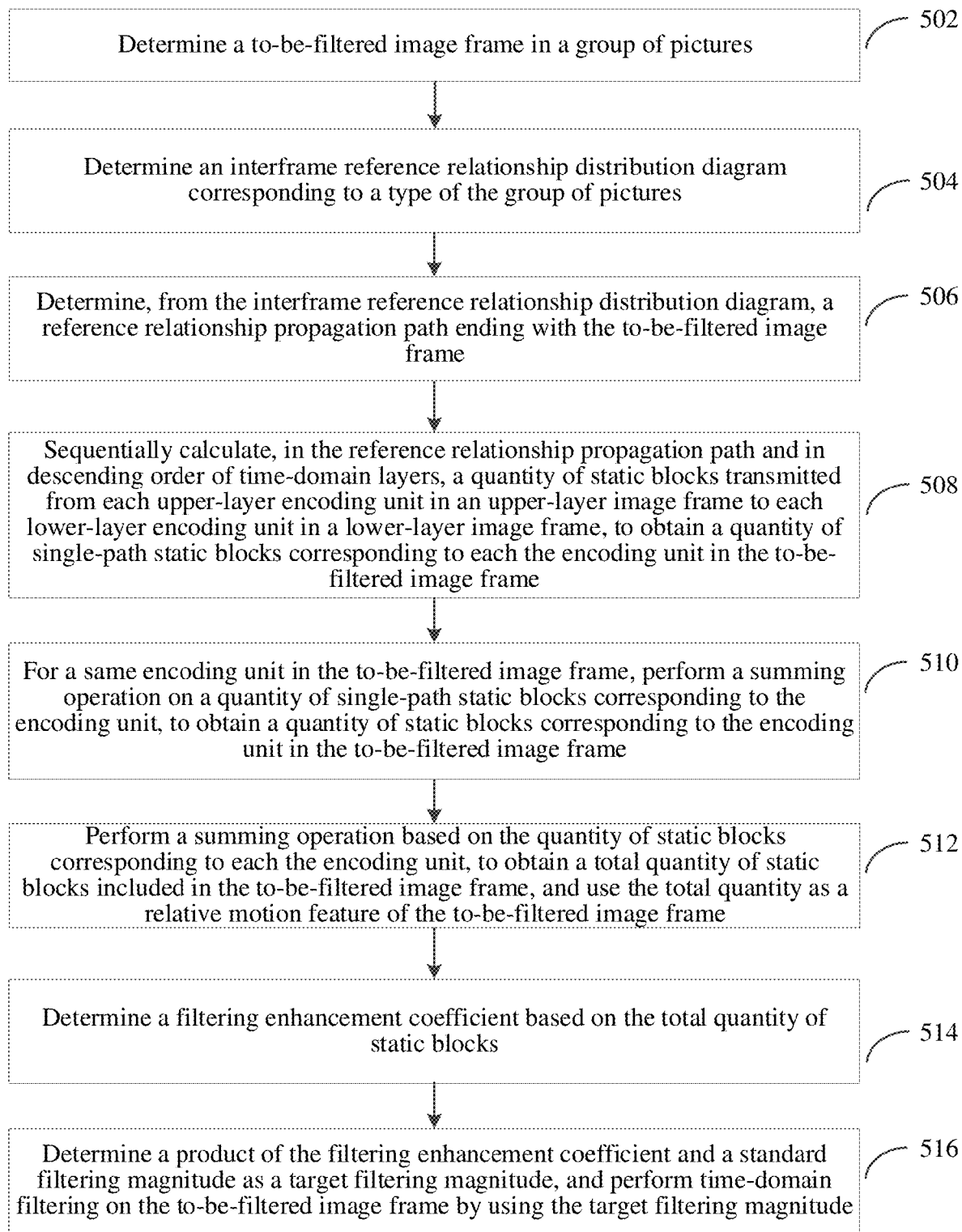
FIG. 5 is a flowchart of an example time-domain filtering method according to some embodiments of the present disclosure.

FIG. 5 is a flowchart of an example time-domain filtering method according to some embodiments of the present disclosure. Specifically, the time-domain filtering method provided in some embodiments of the present disclosure includes the following steps.

Step 502: Determine a to-be-filtered image frame in a group of pictures.

Step 504: Determine an interframe reference relationship distribution diagram corresponding to a type of the group of pictures.

Figure 6:
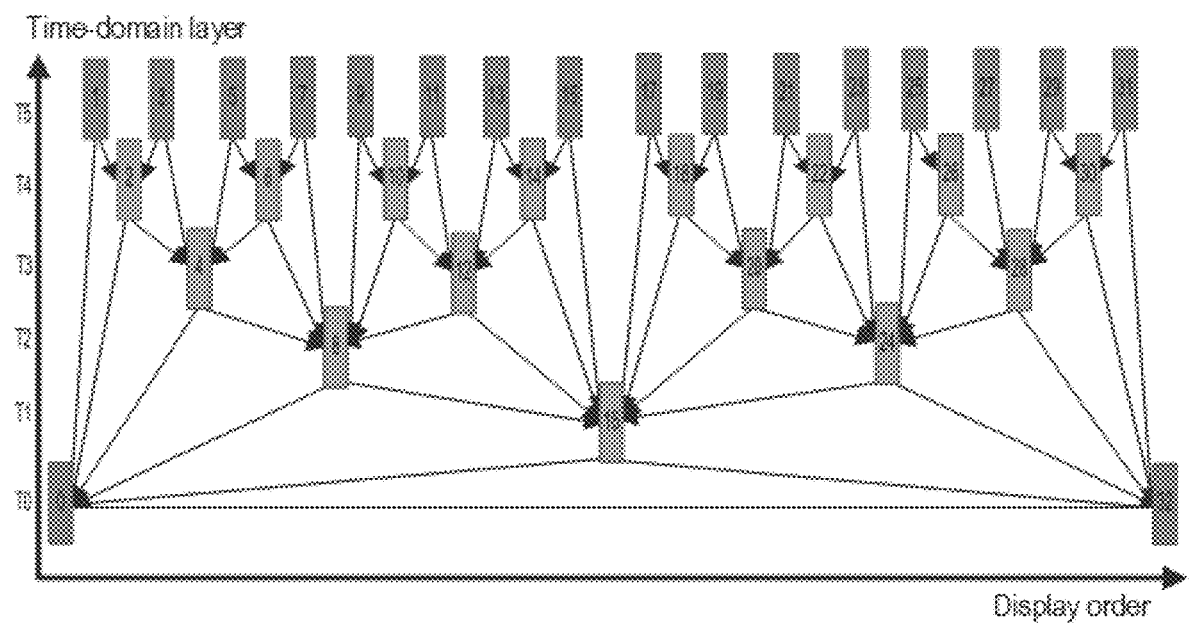
FIG. 6 is an example interframe reference relationship distribution diagram in a GOP, according to some embodiments of the present disclosure.

After the type (size) of the group of pictures is determined, a layer structure and a reference relationship between image frames within the group of pictures are also determined accordingly. FIG. 6 is an example interframe reference relationship distribution diagram in a GOP 32, according to some embodiments of the present disclosure. The reference relationship between image frames can be seen from FIG. 6. For example, an image frame with an image serial number of 16 forward refers to an image frame with an image serial number of 0, and backward refers to an image frame with an image serial number of 32.

Step 506: Determine, from the interframe reference relationship distribution diagram, a reference relationship propagation path that ends with the to-be-filtered image frame.

For a specified to-be-filtered image frame, there can be one reference relationship propagation path ending with the to-be-filtered image frame, or there can be a plurality of reference relationship propagation paths ending with the to-be-filtered image frame. For example, it can be seen from the interframe reference relationship distribution diagram shown in FIG. 6 that, there are a plurality of reference relationship propagation paths ending with a to-be-filtered image frame 0, for example, a first reference relationship propagation path that starts from an image frame 1, passes through an image frame 2, and arrives at the image frame F0; a second reference relationship propagation path that starts from the image frame 1, passes through the image frames 2 and 4 in order, and arrives at the image frame 0; and a third reference relationship propagation path that starts from the image frame 1, passes through the image frames 2, 4, and 8 in order, and arrives at the image frame 0, and so on.

Step 508: Sequentially calculate, in the reference relationship propagation path and in descending order of time-domain layers, a quantity of static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame.

The single-path static block in embodiments of the present disclosure is the static block that is sequentially transmitted layer by layer from a highest time-domain layer along a single reference relationship propagation path, and is at last accumulated to the to-be-filtered image frame.

For example, for a reference relationship propagation path with three layers, a quantity of first static blocks transmitted from each encoding unit in an image frame located at a highest time-domain layer to each encoding unit in an image frame located at a middle time-domain layer is first calculated, and a quantity of second static blocks transmitted from each the encoding unit in the image frame located at the middle time-domain layer to each encoding unit in an image frame (for example, the to-be-filtered image frame) located at a lowest time-domain layer is then calculated. The quantity of second static blocks is a quantity of single-path static blocks corresponding to each the encoding unit in the to-be-filtered image frame. It should be noted that, when calculating the quantity of second static blocks transmitted from each the encoding unit in the image frame located at the middle time-domain layer to each the encoding unit in the image frame located at the lowest time-domain layer, an initial quantity of static blocks (for example, a quantity of to-be-transmitted static blocks) of each encoding unit in the image frame located at the middle time-domain layer is the quantity of first static blocks plus one rather than just one.

Optionally, in some embodiments, a quantity of static blocks transmitted from each the upper-layer encoding unit in the upper-layer image frame to each the lower-layer encoding unit in the lower-layer image frame can be calculated by using the following approaches.

For each upper-layer encoding unit in the upper-layer image frame, determine whether an interframe encoding cost of the upper-layer encoding unit is less than an intraframe encoding cost of the upper-layer encoding unit. If so, determine whether the upper-layer encoding unit propagates a static block based on the interframe encoding cost of the upper-layer encoding unit.

If it is determined that the upper-layer encoding unit propagates the static block, determine one or more target lower-layer encoding unit and a quantity of static blocks transmitted to each target lower-layer encoding unit in the lower-layer image frame based on a quantity of static blocks transmitted to the upper-layer encoding unit, a location of the upper-layer encoding unit, and a motion vector corresponding to the upper-layer encoding unit.

For each lower-layer encoding unit in the lower-layer image frame, perform a summing operation on the quantity of static blocks transmitted to the lower-layer encoding unit, to obtain the quantity of static blocks transmitted from each the upper-layer encoding unit in the upper-layer image frame to the lower-layer encoding unit.

Specifically, determining whether the upper-layer encoding unit propagates a static block includes the following approaches.

One approach is to determine whether the interframe encoding cost of the upper-layer encoding unit is less than a preset encoding cost threshold. If so, determine that the upper-layer encoding unit propagates the static block. This approach directly determines according to the interframe encoding cost and thereby introduces simpler calculations. However, this determining approach considers just one single factor and thereby leads to lower accuracy.

Another approach is to calculate a variance between pixels in the upper-layer encoding unit, and to determine, based on the interframe encoding cost of the upper-layer encoding unit and the variance, whether the upper-layer encoding unit propagates the static block. Furthermore, a ratio of the interframe encoding cost of the upper-layer encoding unit to the variance can be first calculated. If the ratio is less than a preset ratio threshold, determine that the upper-layer encoding unit propagates a static block; or if the ratio is greater than or equal to the preset ratio threshold, determine that the upper-layer encoding unit does not propagate a static block. This approach takes into account both the interframe encoding cost and the pixel value variance in the encoding unit. In this way, an encoding unit with a small motion but also high content complexity is substantially avoided from being mistakenly determined as a static block. In other words, accuracy of determining the static block (propagation) is improved, a filtering magnitude that better matches a motion feature is more likely to be determined, such that the rate-distortion performance of subsequent encoding is additionally improved.

Optionally, in some embodiments, determining the target lower-layer encoding unit and the quantity of static blocks transmitted to each the target lower-layer encoding unit in the lower-layer image frame based on the quantity of static blocks transmitted to the upper-layer encoding unit, the location of the upper-layer encoding unit, and the motion vector corresponding to the upper-layer encoding unit can include:

If unidirectional interframe encoding cost of the upper-layer encoding unit is less than a bidirectional interframe encoding cost, based on the quantity of static blocks transmitted to the upper-layer encoding unit, the location of the upper-layer encoding unit, and the motion vector corresponding to the upper-layer encoding unit, determine the target lower-layer encoding unit and the quantity of static blocks transmitted to each the target lower-layer encoding unit in the lower-layer image frame.

Figure 7:
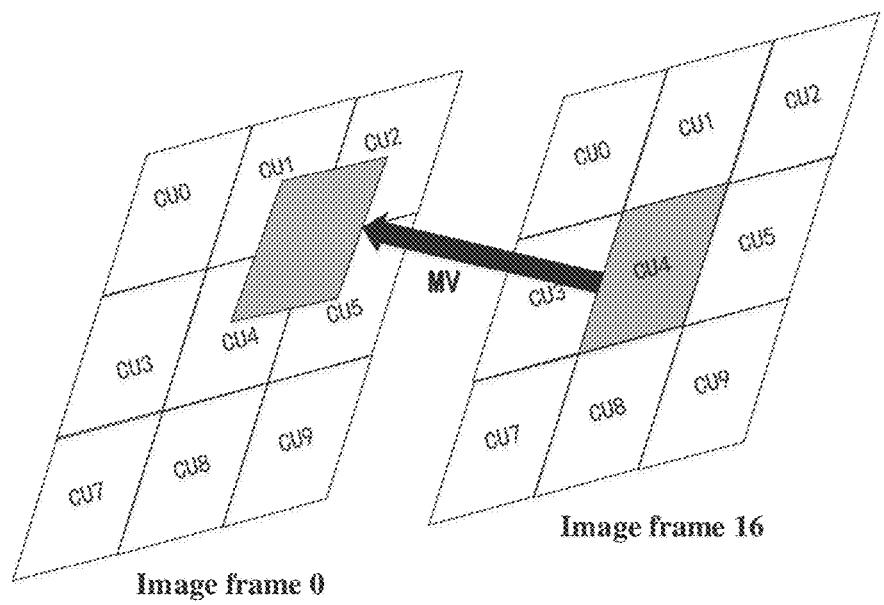
FIG. 7 is an example schematic diagram of interframe propagation of static blocks, according to some embodiments of the present disclosure.

FIG. 7 is an example schematic diagram in which one or more static blocks propagate between image frames, according to some embodiments of the present disclosure. In FIG. 7, the image frame 16 is the upper-layer image frame, the image frame 0 is the lower-layer image frame, and the static block is transmitted from an encoding unit CU4 in the image frame 16 to the image frame 0. Based on a geometric relationship, in the image frame 0, there can be up to four lower-layer encoding units can receive the static block transmitted from the encoding unit CU4 in the image frame 16. In other words, there can be up to four target lower-layer encoding units (identities of the specific target lower-layer unit needs to be obtained by geometric calculation, and it is assumed herein to be encoding units CU1, CU2, CU3, and CU4 in the image frame 0). A proportion of the static blocks received by each target lower-layer encoding unit is not necessarily the same (for any target lower-layer encoding unit among the encoding units CU1, CU2, CU3, and CU4, the received proportion of the static blocks are equal to a proportion of a shaded part in the image frame 0 in FIG. 7 that occupies the target lower-layer encoding unit, where a maximum of the proportion of the static blocks is 1, and a minimum of the proportion of the static blocks is 0).

Based on the foregoing analysis, in embodiments of the present disclosure, if a Position of the Upper-Layer Encoding Unit is (CuX0, CuY0), Coordinates of the Target Lower-Layer Encoding Units Respectively are:
  a coordinate of a first target lower-layer encoding unit is (CuX0+dX, CuY0+dY);
  a coordinate of a second target lower-layer encoding unit is (CuX0+dX+1, CuY0+dY);
  a coordinate of a third target lower-layer encoding unit is (CuX0+dX, CuY0+dY+1); and
  a coordinate of a fourth target lower-layer encoding unit is (CuX0+dX+1, CuY0+dY+1).

A quantity S0 of static blocks transmitted to the first target lower-layer encoding unit is:

$$S0 = (1 + propagateIn) * \frac{(iSize - y)*(iSize - x) + iSize*iSize*0.5}{iSize*iSize} \quad \text{Formula 3}$$

A quantity S1 of static blocks transmitted to the second target lower-layer encoding unit is:

$$S1 = (1 + propagateIn) * \frac{(iSize - y)*x + iSize*iSize*0.5}{iSize*iSize} \quad \text{Formula 4}$$

A quantity S2 of static blocks transmitted to the third target lower-layer encoding unit is:

$$S2 = (1 + propagateIn) * \frac{y*(iSize - x) + iSize*iSize*0.5}{iSize*iSize} \quad \text{Formula 5}$$

A quantity S3 of static blocks transmitted to the fourth target lower-layer encoding unit is:

$$S3 = (1 + propagateIn) * \frac{y*x + iSize*iSize*0.5}{iSize*iSize} \quad \text{Formula 6}$$

Where mv.hor is an abscissa value of the motion vector; mv.ver is an ordinate value of the motion vector; a size of the encoding unit is N*N, a processing accuracy of the motion vector is 1/M pixel accuracy, and iSize=N*M; taking iSize as an unit, a distance between an abscissa of the upper-layer encoding unit and an abscissa of the lower-layer encoding unit is $$dX = \left\lfloor \frac{mv.hor}{iSize} \right\rfloor,$$

a distance between an ordinate of the upper-layer encoding unit and an ordinate of the lower-layer encoding unit is $$dY = \left\lfloor \frac{mv.ver}{iSize} \right\rfloor,$$

and $\lfloor \, \rfloor$ means rounding down; y=mv.ver % iSize (that is, y is equal to a remainder of mv.ver divided by iSize), x=mv.hor % iSize (that is, x is equal to a remainder of mv.hor divided by iSize); and propagateIn is a quantity of static blocks transmitted into the upper-layer encoding unit, and an initial value of propagateIn is 0.

If the bidirectional interframe encoding cost of the upper-layer encoding unit is less than the unidirectional interframe encoding cost, it indicates that there is a static block propagated between the upper-layer encoding unit and an encoding unit in another lower-layer image frame (that is, there is another reference relationship propagation path). In this case, a propagation weight of the static block allocated to the reference relationship propagation path can be first determined, in other words, the propagation weight of the static block propagated between the upper-layer encoding unit and the encoding unit in the lower-layer image frame (on the reference relationship propagation path) is first determined. Then, based on the propagation weight, the quantity of static blocks transmitted to the upper-layer encoding unit, the location of the upper-layer encoding unit, and the motion vector corresponding to the upper-layer encoding unit, the target lower-layer encoding unit and the quantity of static blocks transmitted to each the target lower-layer encoding unit are determined in the lower-layer image frame. Specifically, a calculation approach of the location of the target lower-layer encoding unit is consistent with the calculation approach used when the unidirectional interframe encoding cost is less than the bidirectional interframe encoding cost. A quantity of static blocks transmitted to each the target lower-layer encoding unit respectively are:
  a quantity S0 of static blocks transmitted to the first target lower-layer encoding unit is:

$$S0 = (1 + propagateIn) * \frac{(iSize - y)*(iSize - x) + iSize*iSize*0.5}{iSize*iSize} * w \quad \text{Formula 7}$$

a quantity S1 of static blocks transmitted to the second target lower-layer encoding unit is:

$$S1 = (1 + propagateIn) * \frac{(iSize - y)*x + iSize*iSize*0.5}{iSize*iSize} * w \quad \text{Formula 8}$$

a quantity S2 of static blocks transmitted to the third target lower-layer encoding unit is:

$$S2 = (1 + propagateIn) * \frac{y*(iSize - x) + iSize*iSize*0.5}{iSize*iSize} * w \quad \text{Formula 9}$$

a quantity S3 of static blocks transmitted to the fourth target lower-layer encoding unit is:

$$S3 = (1 + progagateIn) * \frac{y*x + iSize*iSize*0.5}{iSize*iSize} * w, \quad \text{Formula 10}$$

where w is the propagation weight.

Figure 8:
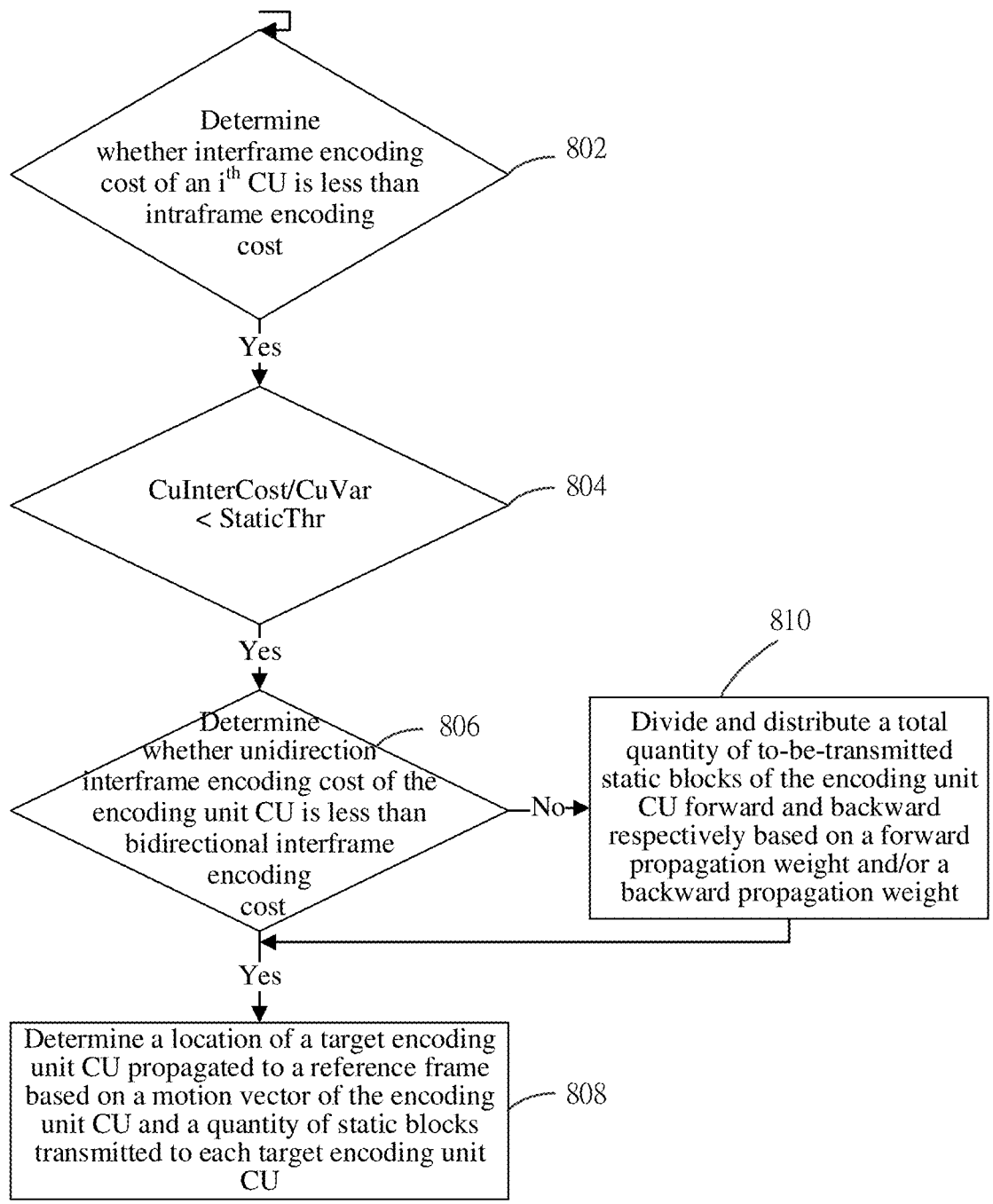
FIG. 8 is a flowchart of an example method for propagation of static blocks, according to some embodiments of the present disclosure.

FIG. 8 is a flowchart of an example method for propagation of one or more static blocks, according to some embodiments of the present disclosure. The following explains a propagation procedure of the static block with reference to FIG. 8.

Step 802: Whether interframe encoding cost of an $i^{th}$ CU (Encoding Unit) is less than intraframe encoding cost is determined. If so, go to Step 804.

Step 804: Calculate a ratio CuInterCost/CuVar of the interframe encoding cost CuInterCost of the encoding unit CU to a pixel value variance CuVar of the encoding unit CU. And determine if the ratio CuInterCost/CuVar is less than a preset ratio threshold StaticThr. If so, go to Step 806.

Step 806: Determine whether unidirectional interframe encoding cost of the CU is less than bidirectional interframe encoding cost is determined. If so, go to Step 808. Otherwise, if not (if it is bidirectional), go to Step 810.

Step 808: Determine a propagation location of a target encoding unit CU in a reference frame (a lower-layer image frame) based on a motion vector of the encoding unit CU, and determine a quantity of static blocks transmitted to each the target encoding unit CU based on the foregoing Formula 3, Formula 4, Formula 5, and Formula 6.

Step 810: Determine a propagation weight corresponding to the reference relationship propagation path first (a forward propagation weight and/or a backward propagation weight, so that a total quantity of static blocks to be transmitted of the encoding unit CU can be divided and distributed forward and backward in proportion respectively based on the forward propagation weight and/or the backward propagation weight). Then determine the propagation location of the target encoding unit CU in the reference frame based on the motion vector of the encoding unit CU. And determine the quantity of static blocks transmitted to each the target encoding unit CU based on the foregoing Formula 7, Formula 8, Formula 9, and Formula 10.

Step 510: For a same encoding unit in the to-be-filtered image frame, perform a summing operation on a quantity of single-path static blocks corresponding to the encoding unit, to obtain a quantity of static blocks corresponding to the encoding unit in the to-be-filtered image frame.

Step 512: Perform a summing operation based on the quantity of static blocks corresponding to each the encoding unit, to obtain a total quantity of static blocks included in the to-be-filtered image frame for serving as a relative motion feature of the to-be-filtered image frame.

Optionally, in some embodiments, after obtaining the quantity of static blocks corresponding to each encoding unit, the summing operation is not performed on the quantity of static blocks corresponding to all the encoding units. Instead, the encoding units are filtered, and the summing operation is performed on the quantity of static blocks corresponding to the encoding unit whose pixel value variance is greater than a preset variance threshold, to obtain the total quantity of static blocks included in the to-be-filtered image frame for serving as the relative motion feature of the to-be-filtered image frame. In this way, when calculating the total quantity of static blocks, the pixel value variance in the encoding unit is taken into account, and the encoding units with smaller variances are excluded. Such that interference from the encoding unit with a solid color or the encoding unit with a flat pixel value change is avoided, thereby accuracy of calculation of the static block is improved. And it leads to a greater likelihood of determining a filtering magnitude that better matches a motion feature, so as to further improve rate-distortion performance of subsequent encoding.

Step 514: Determine a filtering enhancement coefficient based on the total quantity of static blocks.

When a total quantity of static blocks is larger, a filtering enhancement coefficient is larger.

Specifically, the filtering enhancement coefficient can be directly determined based on the total quantity of static blocks, or can be determined based on a calculation result obtained by calculating the total quantity of static blocks. For example, the filtering enhancement coefficient can be determined based on a ratio of the total quantity of static blocks to a total quantity of encoding units in the to-be-filtered image frame.

Step 516: Determine a product of the filtering enhancement coefficient and a standard filtering magnitude as a target filtering magnitude, and perform time-domain filtering on the to-be-filtered image frame by using the target filtering magnitude.

Optionally, in some embodiments, after determining the to-be-filtered image frame in the group of pictures in Step 502, the following step is performed: determining an encoding unit of interest belonging to a region of interest from each the encoding unit in the to-be-filtered image frame. Correspondingly, in Step 516, performing the time-domain filtering on the to-be-filtered image frame by using the target filtering magnitude includes: performing the time-domain filtering on the encoding unit of interest in the to-be-filtered image frame by using a preset filtering magnitude of interest; and performing the time-domain filtering on an encoding unit of non-interest in the to-be-filtered image frame by using the target filtering magnitude.

Specifically, for example, a region flag bit of interest can be respectively added to each the encoding unit in the to-be-filtered image frame. And the region flag bit of interest is used to represent whether each the encoding unit belongs to the region of interest. In embodiments of the present disclosure, whether the region of interest can be customized to set in advance based on an image content of each the encoding unit. And in embodiments of the present disclosure, specific settings on whether the region of interest are not limited in principle.

Because the region of interest is usually the region that the human eyes subjectively pay more attention to, a corresponding filtering magnitude of interest can be set to a smaller value, or even be set to 0. In other words, the filtering operation is skipped on the region of interest, or a weaker filtering magnitude is used to perform the filtering operation on the region of interest. Thus quality of subjective perception by the human eyes is improved.

Figure 9:
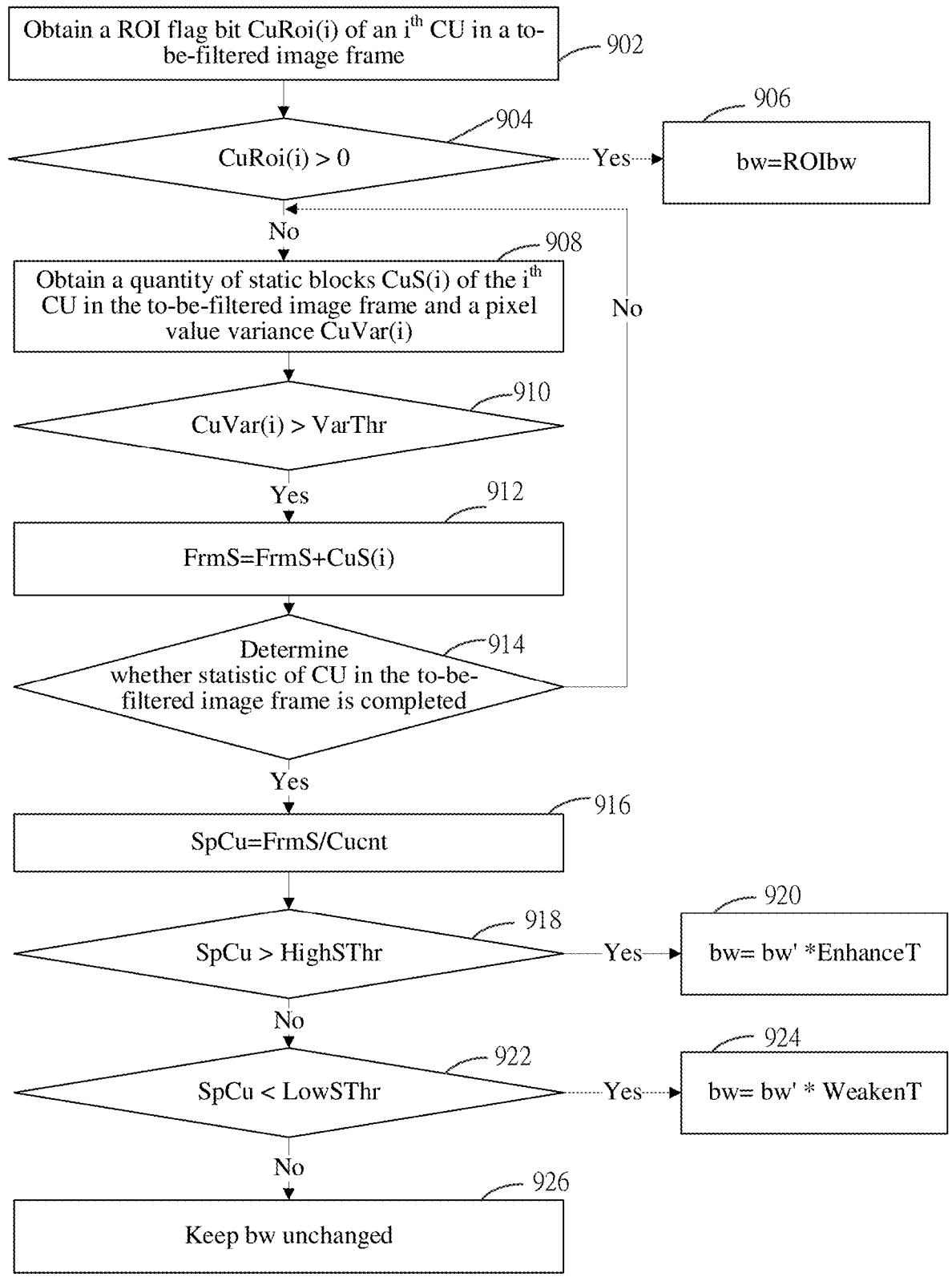
FIG. 9 is a schematic diagram of an exemplary scenario, according to some embodiments of the present disclosure.

FIG. 9 is a schematic diagram of an exemplary scenario, according to some embodiments of the present disclosure. The following describes, with reference to the schematic diagram shown in FIG. 9, some embodiments of the present disclosure by using a specific scenario as an example.

After determining the to-be-filtered image frame in the group of pictures, each encoding unit CU in the to-be-filtered image frame can be performed with the following process respectively.

Step 902: Obtain a region of interest (ROI) flag bit CuRoi(i) of the $i^{th}$ CU.

Step 904: Determine if the ROI flag bit CuRoi(i) is larger than zero. If the ROI flag bit CuRoi(i)>0, go to Step 906. Otherwise, if the ROI flag bit CuRoi(i)≤0, go to Step 908.

Step 906: Determine the encoding unit CU as the encoding unit of interest, and determine a filtering magnitude corresponding to the CU as a preset filtering magnitude of interest ROIbw, that is, bw=ROIbw.

Step 908: Determine the encoding unit CU as the encoding unit of non-interest. And obtain a quantity of static blocks CuS(i) of the $i^{th}$ encoding unit CU in the to-be-filtered image frame and a corresponding pixel value variance CuVar(i), that is, the quantity of static blocks CuS(i) corresponding to the $i^{th}$ encoding unit CU and a pixel value variance CuVar(i).

Step 910: Determine if CuVar(i)>VarThr (VarThr is the preset variance threshold). If so, go to Step 912.

Step 912: Perform a frame-level static block accumulation process, that is, FrmS=FrmS+CuS(i), where FrmS means a quantity of accumulated static blocks in one frame.

Step 914: After the accumulation operation in Step 912 is performed, determine whether statistic of the encoding unit CU in the to-be-filtered image frame is completed. If the statistic is not completed, update i=i+1, and go to Step 908 that obtains the quantity of static blocks CuS(i) of the $i^{th}$ CU in the to-be-filtered image frame and a pixel value variance CuVar(i). If the statistic is completed, go to Step 916.

Step 916: Calculate a quantity SpCu of the static blocks corresponding to an encoding unit CU, SpCu=FrmS/Cncnt, and Cncnt is a total quantity of encoding units CUs included in the to-be-filtered image frame.

Step 918: Determine if SpCu>HighSThr. If so, go to Step 920. Otherwise, if not, go to Step 922.

Step 920: Determine bw=bw'*EnchanceT.

Step 922: Determine if SpCu<LowSThr. If so, go to Step 924. Otherwise, if not (LowSThr<SpCu<HighSThr), go to Step 926.

Step 924: Determine bw=bw'*WeakenT.

Step 926: Keep the filtering magnitude bw unchanged, that is, bw=bw'. HighSThr and LowSThr are respectively a first preset static block quantity threshold and a second preset static block quantity threshold, and HighSThr>LowSThr. EnchanceT and WeakenT are both filtering enhancement coefficients, EnchanceT is greater than 1, and WeakenT is less than 1. bw' is the standard filtering magnitude. In conclusion, during the time-domain filtering, the preset filtering magnitude of interest ROIbw is used to filter the encoding unit of interest; and the filtering magnitude bw=bw'*EnchanceT/bw=bw'*WeakenT/bw=bw' is used to filter the encoding unit of non-interest. Using which one of the foregoing three filtering magnitudes bw depends on a size of the quantity SpCu.

According to the time-domain filtering scheme provided in embodiments of the present disclosure, after determining the to-be-filtered image frame in the group of pictures, the relative motion feature that is of the to-be-filtered image frame and that represents the relative motion complexity between the image contents of the to-be-filtered image frame and the image contents of the remaining image frames is extracted. And then, based on the relative motion feature, the target filtering magnitude that matches the relative motion complexity is adaptively determined and is used to perform the time-domain filtering. In addition, when adaptively determining the filtering magnitude, a larger target filtering magnitude is set in response to smaller relative motion complexity. In this way, for an image frame with more complex relative motion, the filtering magnitude is appropriately reduced during filtering, thereby retaining more valid information to improve the rate-distortion performance of the subsequent encoding. For an image frame with a simpler relative motion, the filtering magnitude is appropriately enhanced during filtering, thereby eliminating more redundant information to improve the rate-distortion performance of the subsequent encoding. Therefore, in embodiments of the present disclosure, the target filtering magnitude that matches the relative motion complexity of the image frame can be adaptively determined and be used to perform the time-domain filtering, so that when encoding a filtered image frame, rate-distortion performance of an encoding result is better.

In addition, in embodiments of the present disclosure, the total quantity of static blocks included in the final to-be-filtered image frame refers to the total quantity of static blocks obtained by accumulating the static blocks sequentially transmitted layer by layer from a highest time-domain layer along each reference relationship propagation path. Compared with only considering a total quantity of static blocks transmitted from a non-filtered image frame that has a direct reference relationship with the to-be-filtered image frame, the total quantity of static blocks determined by embodiments of the present disclosure can more accurately represent the relative motion complexity between image contents of the to-be-filtered image frame and image contents of the remaining image frames in the group of pictures. In other words, the relative motion feature of the to-be-filtered image frame can be more accurately represented, so that a better matched target filtering magnitude can be determined, to improve the rate-distortion performance of the subsequent encoding.

Figure 10:
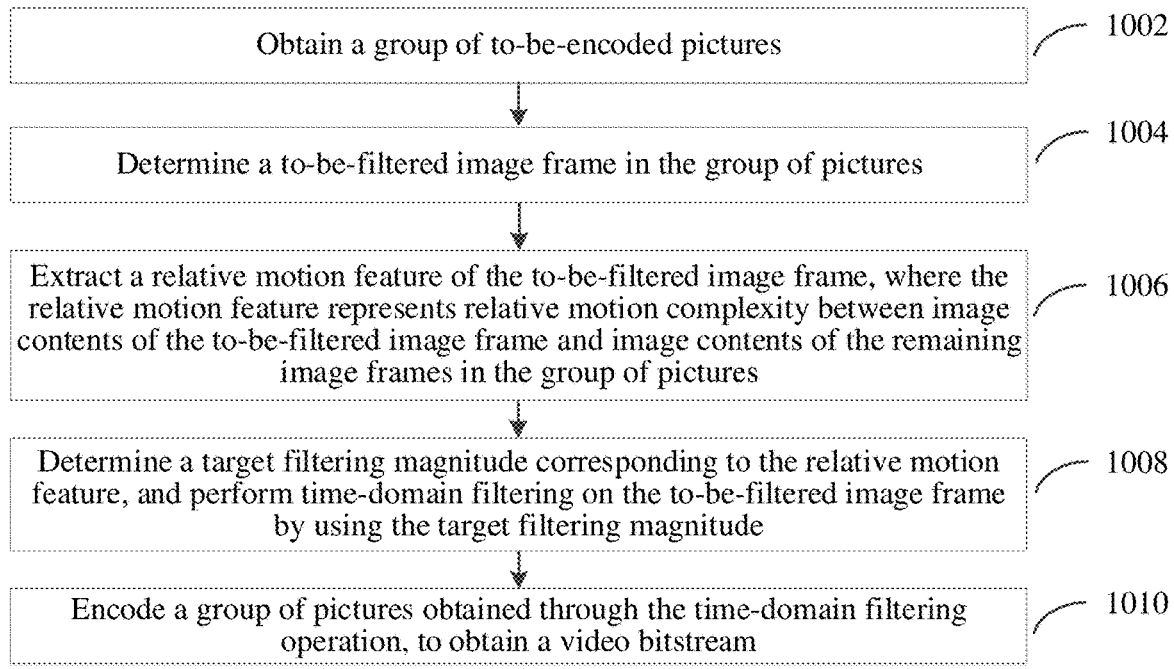
FIG. 10 is a flowchart of an example encoding method according to some embodiments of the present disclosure.

FIG. 10 is a flowchart of an example encoding method according to some embodiments of the present disclosure. The encoding method can be applied to a server device or a client device that has encoding requirements. Specifically, the encoding method provided in some embodiments of the present disclosure includes the following steps.

Step 1002: Obtain a group of to-be-encoded pictures.

The group of pictures can include consecutive to-be-encoded image frames.

Step 1004: Determine a to-be-filtered image frame in the group of pictures.

Step 1006: Extract a relative motion feature of the to-be-filtered image frame, where the relative motion feature represents relative motion complexity between image contents of the to-be-filtered image frame and image contents of the remaining image frames in the group of pictures.

Step 1008: Determine a target filtering magnitude corresponding to the relative motion feature, and perform time-domain filtering on the to-be-filtered image frame by using the target filtering magnitude.

Step 1010: Encode a group of pictures obtained through the time-domain filtering operation, to obtain a video bitstream.

The encoding method provided in embodiments of the present disclosure can be performed by a video encoding terminal (encoder), to perform the time-domain filtering on the to-be-filtered image frame in the group of pictures and then to perform a subsequent encoding operation on the filtered image frame. The foregoing video encoding terminal can be a client or a server. The encoding method provided in this embodiment of the present disclosure can be applied to various scenarios, for example, a video-on-demand scenario, and a corresponding video encoding terminal is the (cloud) server. Specifically, a (cloud) server device can perform the time-domain filtering on a to-be-filtered image frame in a group of pictures (including video image frames of a film and television work such as a movie or TV series) by using the method provided in embodiments of the present disclosure, and can then perform the subsequent encoding operation on filtered video data, to obtain a video bitstream. The video bitstream is sent to a client device to be decoded in the client device, to obtain and play corresponding video media data. For another example, a scenario of storage and streaming transmission for a conventional video game. Specifically, the time-domain filtering is performed on a to-be-filtered image frame in a group of pictures by using the method provided in embodiments of the present disclosure, and then the subsequent encoding operation is performed on a filtered video game to obtain a corresponding video code stream, to enable the video game to be stored and transmitted in a video stream service or another similar application. For another example, a low-latency scenario such as a video conference or a live video, and a corresponding video encoding terminal is the client, that is, a conference terminal. Specifically, video data of the conference can be collected by a video collection device, and then the time-domain filtering is performed on the video data by using the method provided in embodiments of the present disclosure. The subsequent encoding operation is performed on filtered video data to obtain a corresponding video code stream, and the video code stream is sent to a conference terminal and decoded by the conference terminal to obtain and display a corresponding conference video picture. For another example, a scenario of virtual reality. The time-domain filtering is performed on video data by using the method provided in this embodiment of the present disclosure, and then the subsequent encoding operation is performed on filtered video data to obtain a corresponding video code stream. The video code stream is sent to a virtual reality related device (such as VR virtual glasses), and the video code stream is decoded by the VR device to obtain a corresponding video picture, to implement a corresponding VR function (e.g., display) based on the video picture, and so on.

Figure 11:
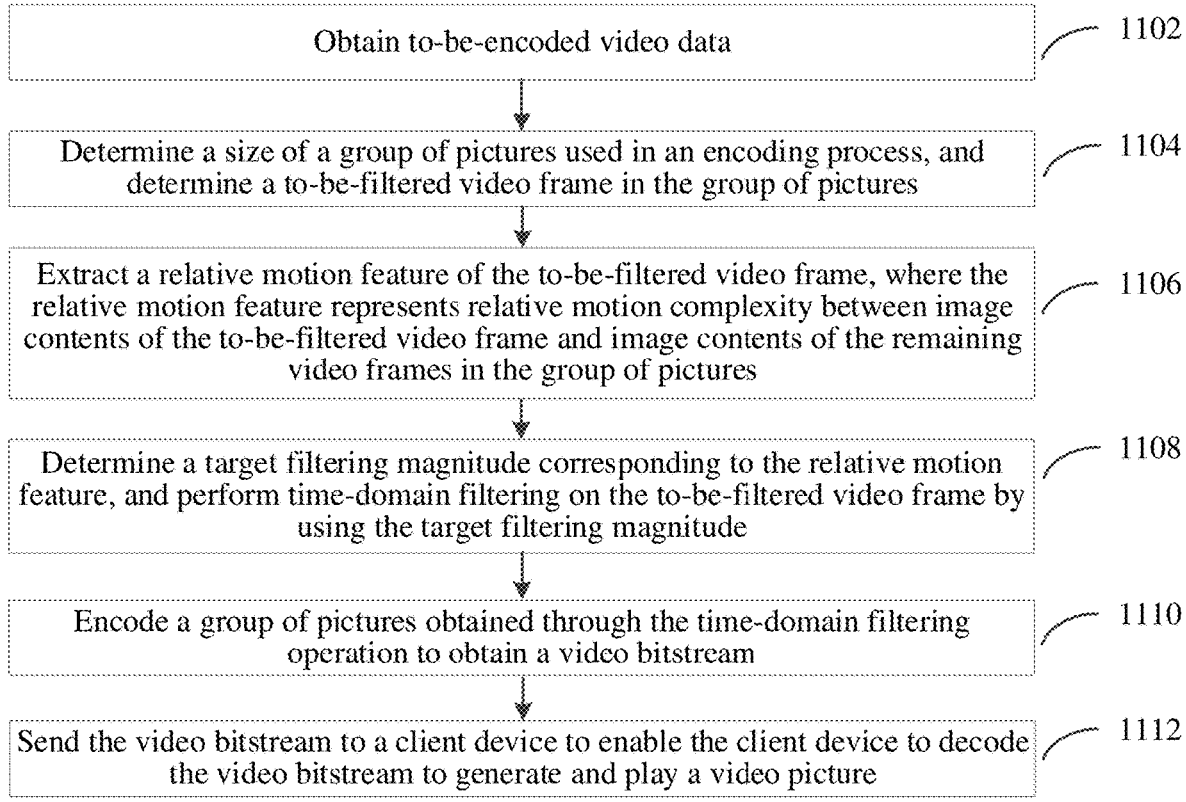
FIG. 11 is a flowchart of an example encoding method according to some embodiments of the present disclosure.

FIG. 11 is a flowchart of an example encoding method according to some embodiments of the present disclosure. The encoding method can be applied to a (cloud) server device that has encoding requirements. Specifically, the encoding method provided in some embodiments of the present disclosure includes the following steps.

Step 1102: Obtain to-be-encoded video data.

Step 1104: Determine a size of a group of pictures used in an encoding process, and determine a to-be-filtered video frame in the group of pictures.

Step 1106: Extract a relative motion feature of the to-be-filtered video frame, where the relative motion feature represents relative motion complexity between image contents of the to-be-filtered video frame and image contents of the remaining video frames in the group of pictures.

Step 1108: Determine a target filtering magnitude corresponding to the relative motion feature, and perform time-domain filtering on the to-be-filtered video frame by using the target filtering magnitude.

Step 1110: Encode a group of pictures obtained through the time-domain filtering operation, to obtain a video bitstream.

Step 1112: Send the video bitstream to a client device to enable the client device to decode the video bitstream to generate and play a video picture.

Figure 12:
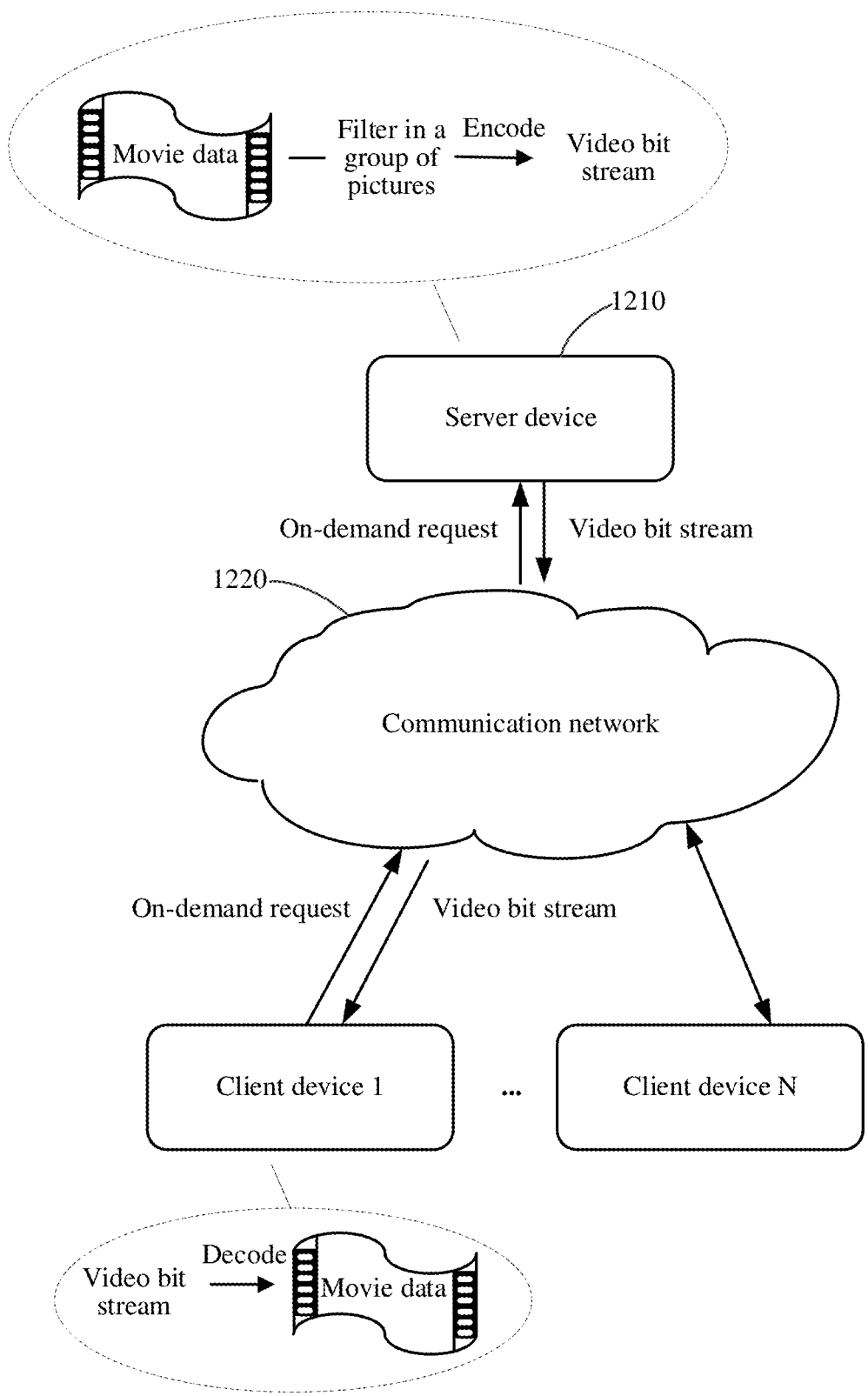
FIG. 12 is a schematic diagram of an exemplary scenario of FIG. 11, according to some embodiments of the present disclosure.

FIG. 12 is a schematic diagram of an exemplary scenario of FIG. 11, according to some embodiments of the present disclosure. The following describes, with reference to the schematic diagram shown in FIG. 12, some embodiments of the present disclosure by using a specific scenario as an example.

FIG. 12 corresponds to a video data on-demand scenario. Specifically, a server device 1210 and each client device (a client device 1, . . . , a client device N) are connected through a communication network 1220. When a user wants to watch a movie A, an on-demand request can be sent to the server device 1210 by the client device (assumed to be the client device 1). After receiving the on-demand request, the server device 1210 can determine movie data of the movie A in a database, and can also determine a size of the group of pictures during encoding. Then, the time-domain filtering method provided in embodiments of the present disclosure can be used to perform a filtering operation on the to-be-filtered image frame in the group of pictures. The server device uses the group of pictures as a basic encoding unit to encode a filtered group of pictures including the movie data, to obtain a video bitstream. The server device 1210 returns the video bitstream to the client device 1 through the communication network 1220. After receiving the video bitstream, the client device 1 can decode the video bitstream to obtain the movie data of movie A, and can play the movie data of movie A in a player for the user to watch.

Figure 13:
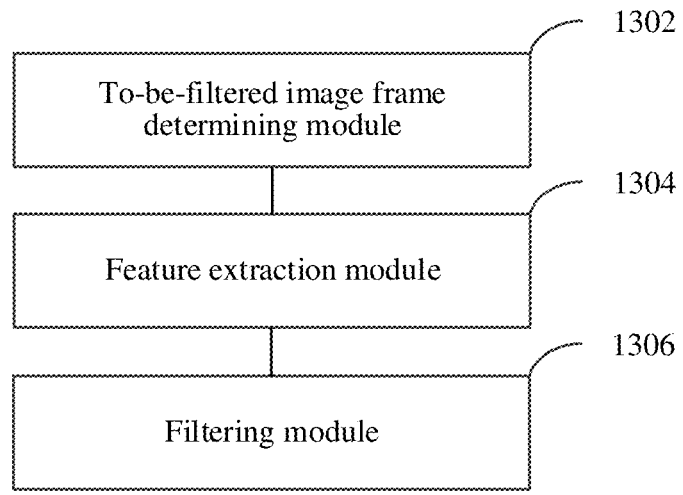
FIG. 13 is a structural block diagram of an example time-domain filtering apparatus, according to some embodiments of the present disclosure.

FIG. 13 is a structural block diagram of an example time-domain filtering apparatus, according to some embodiments of the present disclosure. The time-domain filtering apparatus provided in some embodiments of the present disclosure includes:

a to-be-filtered image frame determining module 1302, configured to determine a to-be-filtered image frame in a group of pictures;

a feature extraction module 1304, configured to extract a relative motion feature of the to-be-filtered image frame, where the relative motion feature represents relative motion complexity between image contents of the to-be-filtered image frame and image contents of the remaining image frames in the group of pictures; and a filtering module 1306, configured to determine a target filtering magnitude corresponding to the relative motion feature, and to perform time-domain filtering on the to-be-filtered image frame by using the target filtering magnitude.

Optionally, in some embodiments, the feature extraction module 1304 is specifically configured to: calculate a total quantity of static blocks included in the to-be-filtered image frame as the relative motion feature of the to-be-filtered image frame.

The filtering module 1306, when performing the step of determining the target filtering magnitude corresponding to the relative motion feature, is specifically configured to: determine a filtering enhancement coefficient based on the total quantity of static blocks; and determine a product of the filtering enhancement coefficient and a standard filtering magnitude as the target filtering magnitude, where when the total quantity of static blocks is larger, the filtering enhancement coefficient is larger.

Optionally, in some embodiments, the feature extraction module 1304 is specifically configured to: determine a quantity of static blocks corresponding to each the encoding unit in the to-be-filtered image frame; and perform a summing operation based on the quantity of static blocks corresponding to each the encoding unit, to obtain the total quantity of static blocks included in the to-be-filtered image frame for serving as the relative motion feature of the to-be-filtered image frame.

Optionally, in some embodiments, the feature extraction module 1304, when performing the step of determining the quantity of static blocks corresponding to each the encoding unit in the to-be-filtered image frame, is specifically configured to:

determine an interframe reference relationship distribution diagram corresponding to a type of the group of pictures;

determine, from the interframe reference relationship distribution diagram, a reference relationship propagation path ending with the to-be-filtered image frame;

sequentially calculate, in the reference relationship propagation path and in descending order of time-domain layers, a quantity of static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and for a same encoding unit in the to-be-filtered image frame, perform a summing operation on a quantity of single-path static blocks corresponding to the encoding unit, to obtain the quantity of static blocks corresponding to the encoding unit in the to-be-filtered image frame.

Optionally, in some embodiments, the feature extraction module 1304, when performing the step of determining the quantity of static blocks transmitted from each the upper-layer encoding unit in the upper-layer image frame to each the lower-layer encoding unit in the lower-layer image frame, is specifically configured to:

for each the upper-layer encoding unit in the upper-layer image frame, determine whether an interframe encoding cost of the upper-layer encoding unit is less than an intraframe encoding cost;

if so, determine, based on the interframe encoding cost of the upper-layer encoding unit, whether the upper-layer encoding unit propagates a static block;

if it is determined that the upper-layer encoding unit propagates the static block, determine, in the lower-layer image frame based on a quantity of static blocks transmitted to the upper-layer encoding unit, a location of the upper-layer encoding unit, and a motion vector corresponding to the upper-layer encoding unit, a target lower-layer encoding unit and a quantity of static blocks transmitted to each the target lower-layer encoding unit; and for each lower-layer encoding unit in the lower-layer image frame, perform a summing operation on the quantity of static blocks transmitted to the lower-layer encoding unit, to obtain the quantity of static blocks transmitted from each the upper-layer encoding unit in the upper-layer image frame to the lower-layer encoding unit.

Optionally, in some embodiments, the feature extraction module 1304, when performing the step of determining, based on the interframe encoding cost of the upper-layer encoding unit, whether the upper-layer encoding unit propagates a static block, is specifically configured to:

calculate a variance between pixels in the upper-layer encoding unit; and determine, based on the interframe encoding cost of the upper-layer encoding unit and the variance, whether the upper-layer encoding unit propagates the static block.

Optionally, in some embodiments, the time-domain filtering apparatus further includes: An encoding unit of interest determining module, configured to determine, from each encoding unit in the to-be-filtered image frame, an encoding unit of interest belonging to a region of interest after determining the to-be-filtered image frame in the group of pictures.

Optionally, in some embodiments, the filtering module 1306, when performing the step of performing time-domain filtering on the to-be-filtered image frame by using the target filtering magnitude, is specifically configured to:

perform the time-domain filtering on the encoding unit of interest in the to-be-filtered image frame by using a preset filtering magnitude of interest; and perform the time-domain filtering on an encoding unit of non-interest in the to-be-filtered image frame by using the target filtering magnitude.

The time-domain filtering apparatus of this embodiment is configured to implement the corresponding time-domain filtering method in the foregoing method embodiments. And the time-domain filtering apparatus of this embodiment has the corresponding beneficial effects of the method embodiments, and related details are not described herein again. In addition, functional implementation of each module in the time-domain filtering apparatus of this embodiment can refer to descriptions of the corresponding part in the foregoing method embodiments, and details are not described herein again.

Figure 14:
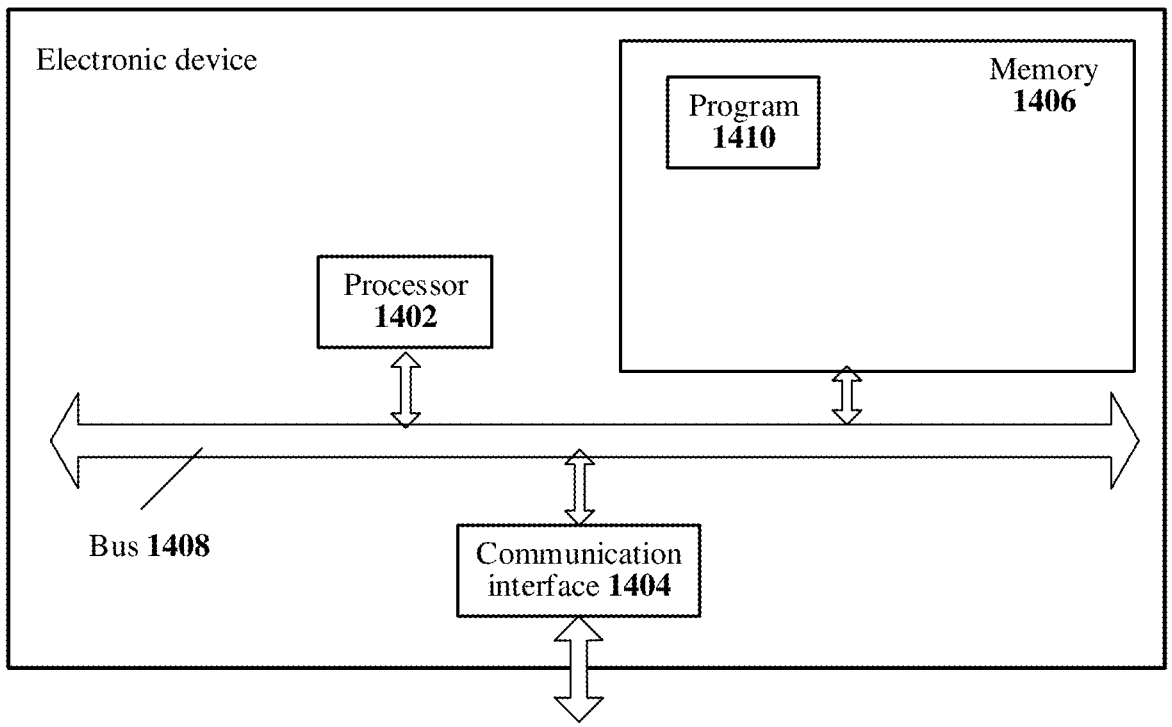
FIG. 14 is a structural schematic diagram of an example electronic device, according to some embodiments of the present disclosure.

FIG. 14 shows a structural schematic diagram of an example electronic device, according to some embodiments of the present disclosure. Implementations of the electronic device are not limited by embodiments of the present disclosure.

As shown in FIG. 14, the electronic device can include: a processor 1402, a communication interface 1404, a memory 1406, and a communication bus 1408.

The processor 1402, the communication interface 1404, and the memory 1406 communicate with each other through the communication bus 1408.

The communication interface 1404 is configured to communicate with another electronic device or server.

The processor 1402 is configured to execute a program 1410, and can specifically perform relevant steps in embodiments of the foregoing time-domain filtering method or the foregoing encoding method.

Specifically, the program 1410 can include program codes, and the program codes include computer operating instructions.

The processor 1402 can be a CPU, an application specific integrated circuit (ASIC), or one or more integrated circuits configured to implement embodiments of the present disclosure. One or more processors included in a smart device can be a same type of processor, such as one or more CPUs, or can be different types of processors, such as one or more CPUs and one or more ASICs.

The memory 1406 is configured to store a program 1410. The memory 1406 can include a high-speed RAM memory, and can further include a non-volatile memory, such as at least one disk memory.

The program 1410 can include a plurality of computer instructions. Specifically, the program 1410 can use the plurality of computer instructions to enable the processor 1402 to perform operations corresponding to the time-domain filtering method or the encoding method described in any of the foregoing method embodiments.

Specific implementation of each step in the program 1410 can refer to the corresponding steps and corresponding descriptions in the units in the foregoing method embodiments, and can have corresponding beneficial effects. Details are not described herein again. A person skilled in the art can clearly understand that, for the purpose of convenient and brief description, for a detailed working process of the foregoing described device and module, refer to a corresponding process description in the foregoing method embodiments. Details are not described herein again.

An embodiment of the present disclosure further provides a computer-readable storage medium. The computer-readable storage medium stores a computer program, and when the program is performed by one or more processors, the method described in any one of the foregoing method embodiments is implemented. The computer-readable storage medium includes but is not limited to: a compact disc read-only memory (Compact Disc Read-Only Memory, CD-ROM), a random access memory (Random Access Memory, RAM), a floppy disk, a hard disk a magneto-optical disk, or the like.

An embodiment of the present disclosure further provides a computer program product including computer instructions. The computer instructions indicate a computer device to perform an operation corresponding to any one of the foregoing method embodiments.

In addition, it should be noted that, user-related information (including but not limited to user equipment information, user personal information, and the like) and data (including but not limited to sample data used to train the model, data for analysis, stored data, displayed data, and the like) involved in embodiments of the present disclosure are all information and data authorized by the user or fully authorized by all parties, the collection, use and processing of relevant data need to comply with the relevant laws and regulations of relevant countries and regions, and a corresponding operation entrance is provided for the user to choose to authorize or reject.

It should be noted that according to the needs of implementations, each part/step described in embodiments of the present disclosure can be divided into more parts/steps, or two or more parts/steps or some operations of parts/steps can be combined into a new part/step, to achieve the objective of embodiments of the present disclosure.

The foregoing method according to embodiments of the present disclosure can be implemented in hardware or firmware, or can be implemented as software or computer codes that can be stored in a recording medium (for example, a CD ROM, a RAM, a floppy disk, a hard disk or a magneto-optical disc), or can be implemented as computer code that is downloaded from a network, is originally stored in a remote recording medium or a non-transitory machine readable medium, and will be stored in a local recording medium. Therefore, the method described herein can be processed by using software that is stored in a recording medium that uses a general-purpose computer, a special-purpose processor or programmable or special-purpose hardware (for example, an application-specific integrated circuit (Application-Specific Integrated Circuit, ASIC) or a field programmable gate array (Field Programmable Gate Array, FPGA). It can be understood that a computer, one or more processors, a microprocessor controller, or programmable hardware includes a storage component (for example, a random access memory (Random Access Memory, RAM), a read-only memory (Read-Only Memory, ROM), and a flash memory) that can store or receive software or computer code. When the software or computer code is accessed and executed by the computer, the one or more processors, or the hardware, the processing method described herein is implemented. In addition, when the general-purpose computer accesses code that is used for implementing processing shown herein, the general-purpose computer that executes the code is changed to a special-purpose computer configured to execute the processing shown herein.

A person of ordinary skill in the art can notice that the exemplary units and method steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art can use different methods to implement the described functions for each particular application, but it is not to be considered that the implementation goes beyond the scope of this embodiment of the present disclosure.

Some embodiments of the present disclosure may further be described using the following clauses:

1. A time-domain filtering method, comprising:
    determining a to-be-filtered image frame in a group of pictures;
    extracting a relative motion feature of the to-be-filtered image frame, wherein the relative motion feature represents relative motion complexity between image contents of the to-be-filtered image frame and image contents of the remaining image frames in the group of pictures; and
    determining a target filtering magnitude corresponding to the relative motion feature, and performing time-domain filtering on the to-be-filtered image frame by using the target filtering magnitude.

2. The method of clause 1, wherein extracting the relative motion feature of the to-be-filtered image frame comprises:
    calculating a total quantity of static blocks in the to-be-filtered image frame as the relative motion feature of the to-be-filtered image frame, wherein the static block is an encoding unit whose relative motion complexity is less than a preset threshold;
    wherein determining the target filtering magnitude corresponding to the relative motion feature comprises:
    determining a filtering enhancement coefficient based on the total quantity of the static blocks; and
    determining a product of the filtering enhancement coefficient and a standard filtering magnitude as the target filtering magnitude, wherein when the total quantity of the static blocks is larger, the filtering enhancement coefficient is larger.

3. The method of clause 2, wherein calculating the total quantity of the static blocks in the to-be-filtered image frame comprises:
    determining a quantity of the static blocks corresponding to each the encoding unit in the to-be-filtered image frame; and
    performing a summing operation on the quantity of the static blocks corresponding to each the encoding unit to obtain the total quantity of the static blocks included in the to-be-filtered image frame.

4. The method of clause 3, wherein determining the quantity of the static blocks corresponding to each the encoding unit in the to-be-filtered image frame comprises:
    determining an interframe reference relationship distribution diagram corresponding to a type of the group of pictures;
    determining, from the interframe reference relationship distribution diagram, a reference relationship propagation path ending at the to-be-filtered image frame;
    sequentially calculating, in the reference relationship propagation path and in descending order of the time-domain, a quantity of the static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and for a same encoding unit in the to-be-filtered image frame, performing the summing operation on the quantity of each the single-path static block corresponding to the encoding unit, to obtain the quantity of the static blocks corresponding to the encoding unit in the to-be-filtered image frame.

5. The method of clause 4, wherein sequentially calculating the quantity of the static blocks transmitted from each the upper-layer encoding unit in the upper-layer image frame to each the lower-layer encoding unit in the lower-layer image frame comprises:

for each the upper-layer encoding unit in the upper-layer image frame, determining whether an interframe encoding cost of the upper-layer encoding unit is less than an intraframe encoding cost of the upper-layer encoding unit;

if the interframe encoding cost of the upper-layer encoding unit is determined to be less than the intraframe encoding cost, determining, based on the interframe encoding cost of the upper-layer encoding unit, whether the upper-layer encoding unit propagates the static blocks; if the upper-layer encoding unit is determined to propagate the static blocks, determining, based on the quantity of static blocks transmitted to the upper-layer encoding unit, a location of the upper-layer encoding unit, and a motion vector corresponding to the upper-layer encoding unit, a plurality of target lower-layer encoding unit in the lower-layer image frame and a quantity of static blocks transmitted to each the target lower-layer encoding unit; and performing a summing operation on the quantity of the static blocks transmitted to each the lower-layer encoding unit in the lower-layer image frame, to obtain the quantity of the static blocks transmitted from each the upper-layer encoding unit in the upper-layer image frame to each the lower-layer encoding unit.

6. The method of clause 5, wherein the determining, based on the interframe encoding cost of the upper-layer encoding unit, whether the upper-layer encoding unit propagates the static blocks comprises:

calculating a variance between pixels in the upper-layer encoding unit; and determining, based on the interframe encoding cost of the upper-layer encoding unit and the variance, whether the upper-layer encoding unit propagates the static blocks.

7. The method of clause 6, wherein the determining, based on the interframe encoding cost of the upper-layer encoding unit and the variance, whether the upper-layer encoding unit propagates the static blocks comprises:

calculating a ratio of the interframe encoding cost of the upper-layer encoding unit to the variance;

if the ratio is less than a preset ratio threshold, determining that the upper-layer encoding unit propagates the static blocks; and if the ratio is greater than or equal to the preset ratio threshold, determining that the upper-layer encoding unit does not propagate the static blocks.

8. The method of clause 1, wherein after determining the to-be-filtered image frame in the group of pictures, the method further comprises:

determining, from each encoding unit in the to-be-filtered image frame, an encoding unit of interest belonging to a region of interest; and wherein performing the time-domain filtering on the to-be-filtered image frame by using the target filtering magnitude comprises:

performing the time-domain filtering on the encoding unit of interest in the to-be-filtered image frame by using a preset filtering magnitude of interest; and performing the time-domain filtering on an encoding unit of non-interest in the to-be-filtered image frame by using the target filtering magnitude.

9. An encoding method, comprising:

obtaining a group of to-be-encoded pictures;

determining a to-be-filtered image frame in the group of to-be-encoded pictures;

extracting a relative motion feature of the to-be-filtered image frame, wherein the relative motion feature represents relative motion complexity between image contents of the to-be-filtered image frame and image contents of the remaining image frames in the group of pictures;

determining a target filtering magnitude corresponding to the relative motion feature, and performing time-domain filtering on the to-be-filtered image frame by using the target filtering magnitude; and encoding a group of pictures obtained by performing the time-domain filtering, to obtain a video bitstream.

10. An encoding method, comprising:

obtaining to-be-encoded video data;

determining a size of a first group of pictures used in an encoding process, and determining a to-be-filtered video frame in the first group of pictures;

extracting a relative motion feature of the to-be-filtered video frame, wherein the relative motion feature represents relative motion complexity between image contents of the to-be-filtered video frame and image contents of the remaining video frames in the first group of pictures;

determining a target filtering magnitude corresponding to the relative motion feature, and performing time-domain filtering on the to-be-filtered video frame by using the target filtering magnitude;

encoding a second group of pictures obtained by performing the time-domain filtering, to obtain a video bitstream; and transmitting the video bitstream to a client device to enable the client device to decode the video bitstream and to generate and display a video picture.

11. An electronic device, comprising: one or more processors, a memory, a communication interface, and a communication bus, wherein the one or more processors, the memory, and the communication interface communicate with each other through the communication bus; and wherein the memory is configured to store at least one executable instruction, and the executable instruction enables the one or more processors to cause the electronic device to perform operations comprising:

determining a to-be-filtered image frame in a group of pictures;

extracting a relative motion feature of the to-be-filtered image frame, wherein the relative motion feature represents relative motion complexity between image contents of the to-be-filtered image frame and image contents of the remaining image frames in the group of pictures; and determining a target filtering magnitude corresponding to the relative motion feature, and performing time-domain filtering on the to-be-filtered image frame by using the target filtering magnitude.

12. The electronic device of clause 11, wherein the operations further comprise:

calculating a total quantity of static blocks in the to-be-filtered image frame as the relative motion feature of the to-be-filtered image frame, wherein the static block is an encoding unit whose relative motion complexity is less than a preset threshold; and determining a filtering enhancement coefficient based on the total quantity of the static blocks, and further configured to determine a product of the filtering enhancement coefficient and a standard filtering magnitude as the target filtering magnitude, wherein when the total quantity of the static blocks is larger, the filtering enhancement coefficient is larger.

13. The electronic device of clause 12, wherein the operations further comprise:

determining a quantity of the static blocks corresponding to each the encoding unit in the to-be-filtered image frame; and performing a summing operation on the quantity of the static blocks corresponding to each the encoding unit to obtain the total quantity of the static blocks included in the to-be-filtered image frame.

14. The electronic device of clause 13, wherein the operations further comprise:

determining an interframe reference relationship distribution diagram corresponding to a type of the group of pictures;

determining, from the interframe reference relationship distribution diagram, a reference relationship propagation path ending at the to-be-filtered image frame;

sequentially calculating, in the reference relationship propagation path and in descending order of the time-domain, a quantity of the static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and for a same encoding unit in the to-be-filtered image frame, performing the summing operation on the quantity of each the single-path static block corresponding to the encoding unit, to obtain the quantity of the static blocks corresponding to the encoding unit in the to-be-filtered image frame.

15. The electronic device of clause 14, wherein the operations further comprise:

for each upper-layer encoding unit in an upper-layer image frame, determining whether an interframe encoding cost of the upper-layer encoding unit is less than an intraframe encoding cost of the upper-layer encoding unit;

if the interframe encoding cost of the upper-layer encoding unit is determined to be less than the intraframe encoding cost, determining, based on the interframe encoding cost of the upper-layer encoding unit, whether the upper-layer encoding unit propagates the static blocks;

if the upper-layer encoding unit is determined to propagate the static blocks, determining, based on the quantity of static blocks transmitted to the upper-layer encoding unit, a location of the upper-layer encoding unit, and a motion vector corresponding to the upper-layer encoding unit, a plurality of target lower-layer encoding unit in a lower-layer image frame and a quantity of static blocks transmitted to each the target lower-layer encoding unit; and performing a summing operation on the quantity of the static blocks transmitted to each the lower-layer encoding unit in the lower-layer image frame, to obtain the quantity of the static blocks transmitted from each the upper-layer encoding unit in the upper-layer image frame to each the lower-layer encoding unit.

16. The electronic device of clause 15, wherein the operations comprise:

calculating a variance between pixels in the upper-layer encoding unit; and determining, based on the interframe encoding cost of the upper-layer encoding unit and the variance, whether the upper-layer encoding unit propagates the static blocks.

17. The electronic device of clause 16, wherein the operations further comprise:

calculating a ratio of the interframe encoding cost of the upper-layer encoding unit to the variance;

if the ratio is less than a preset ratio threshold, determining that the upper-layer encoding unit propagates the static blocks; and if the ratio is greater than or equal to the preset ratio threshold, determining that the upper-layer encoding unit does not propagate the static blocks.

18. The electronic device of clause 11, wherein the operations further comprise:

performing the time-domain filtering on an encoding unit of interest in the to-be-filtered image frame by using a preset filtering magnitude of interest; and further configured to perform the time-domain filtering on an encoding unit of non-interest in the to-be-filtered image frame by using the target filtering magnitude.

19. An electronic device, comprising: one or more processors, a memory, a communication interface, and a communication bus, wherein the one or more processors, the memory, and the communication interface communicate with each other through the communication bus; and wherein the memory is configured to store at least one executable instruction, and the executable instruction enables the one or more processors to cause the electronic device to perform operations comprising:

obtaining a group of to-be-encoded pictures;

determining a to-be-filtered image frame in the group of to-be-encoded pictures;

extracting a relative motion feature of the to-be-filtered image frame, wherein the relative motion feature represents relative motion complexity between image contents of the to-be-filtered image frame and image contents of the remaining image frames in the group of pictures;

determining a target filtering magnitude corresponding to the relative motion feature, and performing time-domain filtering on the to-be-filtered image frame by using the target filtering magnitude; and encoding a group of pictures obtained by performing the time-domain filtering, to obtain a video bitstream.

20. An electronic device, comprising: one or more processors, a memory, a communication interface, and a communication bus, wherein the one or more processors, the memory, and the communication interface communicate with each other through the communication bus; and
wherein the memory is configured to store at least one executable instruction, and the executable instruction enables the one or more processors to cause the electronic device to perform operations comprising:
obtaining to-be-encoded video data;
determining a size of a first group of pictures used in an encoding process, and determining a to-be-filtered video frame in the first group of pictures;
extracting a relative motion feature of the to-be-filtered video frame, wherein the relative motion feature represents relative motion complexity between image contents of the to-be-filtered video frame and image contents of the remaining video frames in the first group of pictures;
determining a target filtering magnitude corresponding to the relative motion feature, and performing time-domain filtering on the to-be-filtered video frame by using the target filtering magnitude;
encoding a second group of pictures obtained by performing the time-domain filtering, to obtain a video bitstream; and
transmitting the video bitstream to a client device to enable the client device to decode the video bitstream and to generate and display a video picture.

21. A non-transitory computer-readable storage medium that stored instructions that are executable by one or more processors of a device to cause the device to perform operations of a time-domain filtering method, the operations comprising:
determining a to-be-filtered image frame in a group of pictures;
extracting a relative motion feature of the to-be-filtered image frame, wherein the relative motion feature represents relative motion complexity between image contents of the to-be-filtered image frame and image contents of the remaining image frames in the group of pictures; and
determining a target filtering magnitude corresponding to the relative motion feature, and performing time-domain filtering on the to-be-filtered image frame by using the target filtering magnitude.

22. The non-transitory computer-readable storage medium of clause 21, wherein the operations further comprise:
calculating a total quantity of static blocks in the to-be-filtered image frame as the relative motion feature of the to-be-filtered image frame, wherein the static block is an encoding unit whose relative motion complexity is less than a preset threshold;
determining a filtering enhancement coefficient based on the total quantity of the static blocks; and
determining a product of the filtering enhancement coefficient and a standard filtering magnitude as the target filtering magnitude, wherein when the total quantity of the static blocks is larger, the filtering enhancement coefficient is larger.

23. The non-transitory computer-readable storage medium of clause 22, wherein the operations further comprise:
determining a quantity of the static blocks corresponding to each the encoding unit in the to-be-filtered image frame; and
performing a summing operation on the quantity of the static blocks corresponding to each the encoding unit to obtain the total quantity of the static blocks included in the to-be-filtered image frame.

24. The non-transitory computer-readable storage medium of clause 23, wherein the operations further comprise:
determining an interframe reference relationship distribution diagram corresponding to a type of the group of pictures;
determining, from the interframe reference relationship distribution diagram, a reference relationship propagation path ending at the to-be-filtered image frame;
sequentially calculating, in the reference relationship propagation path and in descending order of the time-domain, a quantity of the static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and
for a same encoding unit in the to-be-filtered image frame, performing the summing operation on the quantity of each the single-path static block corresponding to the encoding unit, to obtain the quantity of the static blocks corresponding to the encoding unit in the to-be-filtered image frame.

25. The non-transitory computer-readable storage medium of clause 24, wherein the operations further comprise:
for each upper-layer encoding unit in an upper-layer image frame, determining whether an interframe encoding cost of the upper-layer encoding unit is less than an intraframe encoding cost of the upper-layer encoding unit;
if the interframe encoding cost of the upper-layer encoding unit is determined to be less than the intraframe encoding cost, determining, based on the interframe encoding cost of the upper-layer encoding unit, whether the upper-layer encoding unit propagates the static blocks;
if the upper-layer encoding unit is determined to propagate the static blocks, determining, based on the quantity of static blocks transmitted to the upper-layer encoding unit, a location of the upper-layer encoding unit, and a motion vector corresponding to the upper-layer encoding unit, a plurality of target lower-layer encoding unit in a lower-layer image frame and a quantity of static blocks transmitted to each the target lower-layer encoding unit; and
performing a summing operation on the quantity of the static blocks transmitted to each the lower-layer encoding unit in the lower-layer image frame, to obtain the quantity of the static blocks transmitted from each the upper-layer encoding unit in the upper-layer image frame to each the lower-layer encoding unit.

26. The non-transitory computer-readable storage medium of clause 25, wherein the operations further comprise:

calculating a variance between pixels in the upper-layer encoding unit; and determining, based on the interframe encoding cost of the upper-layer encoding unit and the variance, whether the upper-layer encoding unit propagates the static blocks.

27. The non-transitory computer-readable storage medium of clause 26, wherein the operations further comprise:

calculating a ratio of the interframe encoding cost of the upper-layer encoding unit to the variance;

if the ratio is less than a preset ratio threshold, determining that the upper-layer encoding unit propagates the static blocks; and if the ratio is greater than or equal to the preset ratio threshold, determining that the upper-layer encoding unit does not propagate the static blocks.

28. The non-transitory computer-readable storage medium of clause 21, wherein the operations further comprise:

determining, from each encoding unit in the to-be-filtered image frame, an encoding unit of interest belonging to a region of interest;

performing the time-domain filtering on the encoding unit of interest in the to-be-filtered image frame by using a preset filtering magnitude of interest; and performing the time-domain filtering on an encoding unit of non-interest in the to-be-filtered image frame by using the target filtering magnitude.

29. A non-transitory computer-readable storage medium that stores instructions that are executable by one or more processors of a device to cause the device to perform operations of an encoding method, the operations comprising:

obtaining a group of to-be-encoded pictures;

determining a to-be-filtered image frame in the group of to-be-encoded pictures;

extracting a relative motion feature of the to-be-filtered image frame, wherein the relative motion feature represents relative motion complexity between image contents of the to-be-filtered image frame and image contents of the remaining image frames in the group of pictures;

determining a target filtering magnitude corresponding to the relative motion feature, and performing time-domain filtering on the to-be-filtered image frame by using the target filtering magnitude; and encoding a group of pictures obtained by performing the time-domain filtering, to obtain a video bitstream.

30. A non-transitory computer-readable storage medium that stored instructions that are executable by one or more processors of a device to cause the device to perform operations of an encoding method, the operations comprising:

obtaining to-be-encoded video data;

determining a size of a first group of pictures used in an encoding process, and determining a to-be-filtered video frame in the first group of pictures;

extracting a relative motion feature of the to-be-filtered video frame, wherein the relative motion feature represents relative motion complexity between image contents of the to-be-filtered video frame and image contents of the remaining video frames in the first group of pictures;

determining a target filtering magnitude corresponding to the relative motion feature, and performing time-domain filtering on the to-be-filtered video frame by using the target filtering magnitude;

encoding a second group of pictures obtained by performing the time-domain filtering, to obtain a video bitstream; and transmitting the video bitstream to a client device to enable the client device to decode the video bitstream and to generate and display a video picture.

31. A computer program product, wherein the computer program product comprises computer instructions, and the computer instructions instruct a computer device to perform operations corresponding to a time-domain filtering method, the operations comprising:

determining a to-be-filtered image frame in a group of pictures;

extracting a relative motion feature of the to-be-filtered image frame, wherein the relative motion feature represents relative motion complexity between image contents of the to-be-filtered image frame and image contents of the remaining image frames in the group of pictures; and determining a target filtering magnitude corresponding to the relative motion feature, and performing time-domain filtering on the to-be-filtered image frame by using the target filtering magnitude.

32. The computer program product of clause 31, wherein the operations further comprise:

calculating a total quantity of static blocks in the to-be-filtered image frame as the relative motion feature of the to-be-filtered image frame, wherein the static block is an encoding unit whose relative motion complexity is less than a preset threshold;

determining a filtering enhancement coefficient based on the total quantity of the static blocks; and determining a product of the filtering enhancement coefficient and a standard filtering magnitude as the target filtering magnitude, wherein when the total quantity of the static blocks is larger, the filtering enhancement coefficient is larger.

33. The computer program product of clause 32, wherein the operations further comprise:

determining a quantity of the static blocks corresponding to each the encoding unit in the to-be-filtered image frame; and performing a summing operation on the quantity of the static blocks corresponding to each the encoding unit to obtain the total quantity of the static blocks included in the to-be-filtered image frame.

34. The computer program product of clause 33, wherein the operations further comprise:

determining an interframe reference relationship distribution diagram corresponding to a type of the group of pictures;

determining, from the interframe reference relationship distribution diagram, a reference relationship propagation path ending at the to-be-filtered image frame;

sequentially calculating, in the reference relationship propagation path and in descending order of the time-domain, a quantity of the static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and for a same encoding unit in the to-be-filtered image frame, performing the summing operation on the quantity of each the single-path static block corresponding to the encoding unit, to obtain the quantity of the static blocks corresponding to the encoding unit in the to-be-filtered image frame.

35. The computer program product of clause 34, wherein the operations further comprise:
for each upper-layer encoding unit in an upper-layer image frame, determining whether an interframe encoding cost of the upper-layer encoding unit is less than an intraframe encoding cost of the upper-layer encoding unit;
if the interframe encoding cost of the upper-layer encoding unit is determined to be less than the intraframe encoding cost, determining, based on the interframe encoding cost of the upper-layer encoding unit, whether the upper-layer encoding unit propagates the static blocks;
if the upper-layer encoding unit is determined to propagate the static blocks, determining, based on the quantity of static blocks transmitted to the upper-layer encoding unit, a location of the upper-layer encoding unit, and a motion vector corresponding to the upper-layer encoding unit, a plurality of target lower-layer encoding unit in a lower-layer image frame and a quantity of static blocks transmitted to each the target lower-layer encoding unit; and
performing a summing operation on the quantity of the static blocks transmitted to each the lower-layer encoding unit in the lower-layer image frame, to obtain the quantity of the static blocks transmitted from each the upper-layer encoding unit in the upper-layer image frame to each the lower-layer encoding unit.

36. The computer program product of clause 35, wherein the operations further comprise:
calculating a variance between pixels in the upper-layer encoding unit; and
determining, based on the interframe encoding cost of the upper-layer encoding unit and the variance, whether the upper-layer encoding unit propagates the static blocks.

37. The computer program product of clause 36, wherein the operations further comprise:
calculating a ratio of the interframe encoding cost of the upper-layer encoding unit to the variance;
if the ratio is less than a preset ratio threshold, determining that the upper-layer encoding unit propagates the static blocks; and
if the ratio is greater than or equal to the preset ratio threshold, determining that the upper-layer encoding unit does not propagate the static blocks.

38. The computer program product of clause 31, wherein the operations further comprise:
determining, from each encoding unit in the to-be-filtered image frame, an encoding unit of interest belonging to a region of interest;
performing the time-domain filtering on the encoding unit of interest in the to-be-filtered image frame by using a preset filtering magnitude of interest; and
performing the time-domain filtering on an encoding unit of non-interest in the to-be-filtered image frame by using the target filtering magnitude.

39. A computer program product, wherein the computer program product comprises computer instructions, and the computer instructions instruct a computer device to perform operations corresponding to an encoding method, the operations comprising:
obtaining a group of to-be-encoded pictures;
determining a to-be-filtered image frame in the group of to-be-encoded pictures;
extracting a relative motion feature of the to-be-filtered image frame, wherein the relative motion feature represents relative motion complexity between image contents of the to-be-filtered image frame and image contents of the remaining image frames in the group of pictures;
determining a target filtering magnitude corresponding to the relative motion feature, and performing time-domain filtering on the to-be-filtered image frame by using the target filtering magnitude; and
encoding a group of pictures obtained by performing the time-domain filtering, to obtain a video bitstream.

40. A computer program product, wherein the computer program product comprises computer instructions, and the computer instructions instruct a computer device to perform operations corresponding to an encoding method, the operations comprising:
obtaining to-be-encoded video data;
determining a size of a first group of pictures used in an encoding process, and determining a to-be-filtered video frame in the first group of pictures;
extracting a relative motion feature of the to-be-filtered video frame, wherein the relative motion feature represents relative motion complexity between image contents of the to-be-filtered video frame and image contents of the remaining video frames in the first group of pictures;
determining a target filtering magnitude corresponding to the relative motion feature, and performing time-domain filtering on the to-be-filtered video frame by using the target filtering magnitude;
encoding a second group of pictures obtained by performing the time-domain filtering, to obtain a video bitstream; and
transmitting the video bitstream to a client device to enable the client device to decode the video bitstream and to generate and display a video picture.

The foregoing implementations are merely used to illustrate embodiments of the present disclosure, but are not intended to limit embodiments of the present disclosure. A person of ordinary skill in the relevant technical fields can also make various changes and modifications without departing from the spirit and scope of embodiments of the present disclosure. Therefore, all equivalent technical solutions also fall within the scope of embodiments of the present disclosure, and the patent protection scope of embodiments of the present disclosure should be limited by the claims.

What is claimed is:

1. An electronic device, comprising: one or more processors, a memory, a communication interface, and a communication bus, wherein the one or more processors, the memory, and the communication interface communicate with each other through the communication bus; and
wherein the memory is configured to store at least one executable instruction, and the executable instruction enables the one or more processors to cause the electronic device to perform operations comprising:
determining a to-be-filtered image frame in a group of pictures;
extracting a relative motion feature of the to-be-filtered image frame, wherein the relative motion feature represents relative motion complexity between image contents of the to-be-filtered image frame and image contents of the remaining image frames in the group of pictures; and determining a target filtering magnitude corresponding to the relative motion feature, and performing time-domain filtering on the to-be-filtered image frame by using the target filtering magnitude.

2. The electronic device of claim 1, wherein the operations further comprise:

calculating a total quantity of static blocks in the to-be-filtered image frame as the relative motion feature of the to-be-filtered image frame, wherein the static block is an encoding unit whose relative motion complexity is less than a preset threshold; and determining a filtering enhancement coefficient based on the total quantity of the static blocks, and further configured to determine a product of the filtering enhancement coefficient and a standard filtering magnitude as the target filtering magnitude, wherein when the total quantity of the static blocks is larger, the filtering enhancement coefficient is larger.

3. The electronic device of claim 2, wherein the operations further comprise:

determining a quantity of the static blocks corresponding to each the encoding unit in the to-be-filtered image frame; and performing a summing operation on the quantity of the static blocks corresponding to each the encoding unit to obtain the total quantity of the static blocks included in the to-be-filtered image frame.

4. The electronic device of claim 3, wherein the operations further comprise:

determining an interframe reference relationship distribution diagram corresponding to a type of the group of pictures;

determining, from the interframe reference relationship distribution diagram, a reference relationship propagation path ending at the to-be-filtered image frame;

sequentially calculating, in the reference relationship propagation path and in descending order of the time-domain, a quantity of the static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and for a same encoding unit in the to-be-filtered image frame, performing the summing operation on the quantity of each the single-path static block corresponding to the encoding unit, to obtain the quantity of the static blocks corresponding to the encoding unit in the to-be-filtered image frame.

5. The electronic device of claim 4, wherein the operations further comprise:

for each upper-layer encoding unit in an upper-layer image frame, determining whether an interframe encoding cost of the upper-layer encoding unit is less than an intraframe encoding cost of the upper-layer encoding unit;

if the interframe encoding cost of the upper-layer encoding unit is determined to be less than the intraframe encoding cost, determining, based on the interframe encoding cost of the upper-layer encoding unit, whether the upper-layer encoding unit propagates the static blocks;

if the upper-layer encoding unit is determined to propagate the static blocks, determining, based on the quantity of static blocks transmitted to the upper-layer encoding unit, a location of the upper-layer encoding unit, and a motion vector corresponding to the upper-layer encoding unit, a plurality of target lower-layer encoding unit in a lower-layer image frame and a quantity of static blocks transmitted to each the target lower-layer encoding unit; and performing a summing operation on the quantity of the static blocks transmitted to each the lower-layer encoding unit in the lower-layer image frame, to obtain the quantity of the static blocks transmitted from each the upper-layer encoding unit in the upper-layer image frame to each the lower-layer encoding unit.

6. The electronic device of claim 5, wherein the operations comprise:

calculating a variance between pixels in the upper-layer encoding unit; and determining, based on the interframe encoding cost of the upper-layer encoding unit and the variance, whether the upper-layer encoding unit propagates the static blocks.

7. The electronic device of claim 6, wherein the operations further comprise:

calculating a ratio of the interframe encoding cost of the upper-layer encoding unit to the variance;

if the ratio is less than a preset ratio threshold, determining that the upper-layer encoding unit propagates the static blocks; and if the ratio is greater than or equal to the preset ratio threshold, determining that the upper-layer encoding unit does not propagate the static blocks.

8. The electronic device of claim 1, wherein the operations further comprise:

performing the time-domain filtering on an encoding unit of interest in the to-be-filtered image frame by using a preset filtering magnitude of interest; and further configured to perform the time-domain filtering on an encoding unit of non-interest in the to-be-filtered image frame by using the target filtering magnitude.

9. A time-domain filtering method, comprising:

determining a to-be-filtered image frame in a group of pictures;

extracting a relative motion feature of the to-be-filtered image frame, wherein the relative motion feature represents relative motion complexity between image contents of the to-be-filtered image frame and image contents of the remaining image frames in the group of pictures; and determining a target filtering magnitude corresponding to the relative motion feature, and performing time-domain filtering on the to-be-filtered image frame by using the target filtering magnitude.

10. The method of claim 9, wherein extracting the relative motion feature of the to-be-filtered image frame comprises:

calculating a total quantity of static blocks in the to-be-filtered image frame as the relative motion feature of the to-be-filtered image frame, wherein the static block is an encoding unit whose relative motion complexity is less than a preset threshold;

wherein determining the target filtering magnitude corresponding to the relative motion feature comprises:

determining a filtering enhancement coefficient based on the total quantity of the static blocks; and determining a product of the filtering enhancement coefficient and a standard filtering magnitude as the target filtering magnitude, wherein when the total quantity of the static blocks is larger, the filtering enhancement coefficient is larger.

11. The method of claim 10, wherein calculating the total quantity of the static blocks in the to-be-filtered image frame comprises:
   determining a quantity of the static blocks corresponding to each the encoding unit in the to-be-filtered image frame; and
   performing a summing operation on the quantity of the static blocks corresponding to each the encoding unit to obtain the total quantity of the static blocks included in the to-be-filtered image frame.

12. The method of claim 11, wherein determining the quantity of the static blocks corresponding to each the encoding unit in the to-be-filtered image frame comprises:
   determining an interframe reference relationship distribution diagram corresponding to a type of the group of pictures;
   determining, from the interframe reference relationship distribution diagram, a reference relationship propagation path ending at the to-be-filtered image frame;
   sequentially calculating, in the reference relationship propagation path and in descending order of the time-domain, a quantity of the static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and
   for a same encoding unit in the to-be-filtered image frame, performing the summing operation on the quantity of each the single-path static block corresponding to the encoding unit, to obtain the quantity of the static blocks corresponding to the encoding unit in the to-be-filtered image frame.

13. The method of claim 12, wherein sequentially calculating the quantity of the static blocks transmitted from each the upper-layer encoding unit in the upper-layer image frame to each the lower-layer encoding unit in the lower-layer image frame comprises:
   for each the upper-layer encoding unit in the upper-layer image frame, determining whether an interframe encoding cost of the upper-layer encoding unit is less than an intraframe encoding cost of the upper-layer encoding unit;
   if the interframe encoding cost of the upper-layer encoding unit is determined to be less than the intraframe encoding cost, determining, based on the interframe encoding cost of the upper-layer encoding unit, whether the upper-layer encoding unit propagates the static blocks;
   if the upper-layer encoding unit is determined to propagate the static blocks, determining, based on the quantity of static blocks transmitted to the upper-layer encoding unit, a location of the upper-layer encoding unit, and a motion vector corresponding to the upper-layer encoding unit, a plurality of target lower-layer encoding unit in the lower-layer image frame and a quantity of static blocks transmitted to each the target lower-layer encoding unit; and
   performing a summing operation on the quantity of the static blocks transmitted to each the lower-layer encoding unit in the lower-layer image frame, to obtain the quantity of the static blocks transmitted from each the upper-layer encoding unit in the upper-layer image frame to each the lower-layer encoding unit.

14. The method of claim 13, wherein the determining, based on the interframe encoding cost of the upper-layer encoding unit, whether the upper-layer encoding unit propagates the static blocks comprises:
   calculating a variance between pixels in the upper-layer encoding unit; and
   determining, based on the interframe encoding cost of the upper-layer encoding unit and the variance, whether the upper-layer encoding unit propagates the static blocks.

15. The method of claim 14, wherein the determining, based on the interframe encoding cost of the upper-layer encoding unit and the variance, whether the upper-layer encoding unit propagates the static blocks comprises:
   calculating a ratio of the interframe encoding cost of the upper-layer encoding unit to the variance;
   if the ratio is less than a preset ratio threshold, determining that the upper-layer encoding unit propagates the static blocks; and
   if the ratio is greater than or equal to the preset ratio threshold, determining that the upper-layer encoding unit does not propagate the static blocks.

16. The method of claim 9, wherein after determining the to-be-filtered image frame in the group of pictures, the method further comprises:
   determining, from each encoding unit in the to-be-filtered image frame, an encoding unit of interest belonging to a region of interest; and
   wherein performing the time-domain filtering on the to-be-filtered image frame by using the target filtering magnitude comprises:
   performing the time-domain filtering on the encoding unit of interest in the to-be-filtered image frame by using a preset filtering magnitude of interest; and
   performing the time-domain filtering on an encoding unit of non-interest in the to-be-filtered image frame by using the target filtering magnitude.

17. An electronic device, comprising: one or more processors, a memory, a communication interface, and a communication bus, wherein the one or more processors, the memory, and the communication interface communicate with each other through the communication bus; and
   wherein the memory is configured to store at least one executable instruction, and the executable instruction enables the one or more processors to cause the electronic device to perform operations comprising:
   obtaining a group of to-be-encoded pictures;
   determining a to-be-filtered image frame in the group of to-be-encoded pictures;
   extracting a relative motion feature of the to-be-filtered image frame, wherein the relative motion feature represents relative motion complexity between image contents of the to-be-filtered image frame and image contents of the remaining image frames in the group of pictures;
   determining a target filtering magnitude corresponding to the relative motion feature, and performing time-domain filtering on the to-be-filtered image frame by using the target filtering magnitude; and
   encoding a group of pictures obtained by performing the time-domain filtering, to obtain a video bitstream.

18. The electronic device of claim 17, wherein the operations further comprise:
   calculating a total quantity of static blocks in the to-be-filtered image frame as the relative motion feature of the to-be-filtered image frame, wherein the static block is an encoding unit whose relative motion complexity is less than a preset threshold; and
   determining a filtering enhancement coefficient based on the total quantity of the static blocks, and further configured to determine a product of the filtering enhancement coefficient and a standard filtering magnitude as the target filtering magnitude, wherein when the total quantity of the static blocks is larger, the filtering enhancement coefficient is larger.

19. The electronic device of claim 18, wherein the operations further comprise:
   determining a quantity of the static blocks corresponding to each the encoding unit in the to-be-filtered image frame; and
   performing a summing operation on the quantity of the static blocks corresponding to each the encoding unit to obtain the total quantity of the static blocks included in the to-be-filtered image frame.

20. The electronic device of claim 19, wherein the operations further comprise:
   determining an interframe reference relationship distribution diagram corresponding to a type of the group of pictures;
   determining, from the interframe reference relationship distribution diagram, a reference relationship propagation path ending at the to-be-filtered image frame;
   sequentially calculating, in the reference relationship propagation path and in descending order of the time-domain, a quantity of the static blocks transmitted from each upper-layer encoding unit in an upper-layer image frame to each lower-layer encoding unit in a lower-layer image frame, to obtain a quantity of single-path static blocks corresponding to each the encoding unit in the to-be-filtered image frame; and
   for a same encoding unit in the to-be-filtered image frame, performing the summing operation on the quantity of each the single-path static block corresponding to the encoding unit, to obtain the quantity of the static blocks corresponding to the encoding unit in the to-be-filtered image frame.

* * * * *